(12) United States Patent
Paczkowski et al.

(10) Patent No.: US 11,924,908 B1
(45) Date of Patent: Mar. 5, 2024

(54) USER EQUIPMENT NETWORK RADIO LINK STATE MANAGEMENT FOR AMBIENT ELECTROMAGNETIC POWER HARVESTING CHIP READER APPLICATIONS AND DEVICES

(71) Applicant: T-MOBILE INNOVATIONS LLC, Overland Park, KS (US)

(72) Inventors: Lyle Walter Paczkowski, Mission Hills, KS (US); Marouane Balmakhtar, Fairfax, VA (US); Galip Murat Karabulut, Vienna, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/056,217

(22) Filed: Nov. 16, 2022

(51) Int. Cl.
*H04W 76/30* (2018.01)
*H04W 76/27* (2018.01)
*H04W 76/28* (2018.01)
*H04W 4/80* (2018.01)

(52) U.S. Cl.
CPC .......... *H04W 76/28* (2018.02); *H04W 76/27* (2018.02); *H04W 4/80* (2018.02)

(58) Field of Classification Search
CPC ....... H04W 76/28; H04W 76/27; H04W 4/80; H04W 76/30; H04B 5/0062; H04B 1/005
See application file for complete search history.

(56) References Cited

U.S. PATENT DOCUMENTS

| 11,258,302 | B1 | 2/2022 | Marquardt et al. | |
| 2012/0184323 | A1* | 7/2012 | Hara | H04W 76/28 455/525 |
| 2012/0268250 | A1* | 10/2012 | Kaufman | H04W 4/80 340/10.1 |
| 2018/0160422 | A1* | 6/2018 | Pathak | H04W 76/10 |
| 2020/0334510 | A1* | 10/2020 | Hu | G06K 19/07728 |
| 2022/0116990 | A1* | 4/2022 | Cariou | H04W 76/27 |
| 2022/0240343 | A1* | 7/2022 | Zhang | H04W 76/27 |

OTHER PUBLICATIONS

U.S. Appl. No. 17/816,970 "Systems and Methods for an Ambient Electromagnetic Power Harvesting Chip Reader-Writer Apparatus" filed Aug. 2, 2022.
U.S. Appl. No. 17/816,972 "Systems and Methods for Performing High Speed Interactions With Electromagnetic Power Harvesting Chips" filed Aug. 2, 2022.

* cited by examiner

*Primary Examiner* — Andrew Wendell
(74) *Attorney, Agent, or Firm* — Shook, Hardy & Bacon L.L.P.

(57) ABSTRACT

User equipment (UE) network radio link state management for ambient electromagnetic power harvesting chip (AEPH) reader applications and devices is provided. In some embodiments, radio link state management services are provided that may be engaged by a UE that can wirelessly communicate both with a wireless telecommunications network, and an AEPH chip. Embodiments may include a method that determines when an AEPH chip communication event is pending, suspends a UE connection state of at least one data channel of the one or more data channels of the UE radio link in response to the determining when the AEPH chip communication event is pending, performs the AEPH chip communication event; and releases suspension of the UE connection state of the at least one data channel of the one or more data channels of the UE radio link.

20 Claims, 10 Drawing Sheets

USER EQUIPMENT NETWORK RADIO LINK STATE MANAGEMENT FOR AMBIENT ELECTROMAGNETIC POWER HARVESTING CHIP READER APPLICATIONS AND DEVICES

BACKGROUND

Ambient electromagnetic power harvesting (AEPH) chips, such as radio frequency identification (RFID) chips, are small inexpensive semiconductor devices that have no on-board power. When irradiated with an appropriate electromagnetic field, the AEPH chip draws power from the energy in the electromagnetic field and wirelessly transmits an identity via a radio frequency. Special scanning or reading devices are used to stimulate the AEPH chips with an electromagnetic field, and read information broadcast by the AEPH chips in response to receiving the electromagnetic field. Frequency ranges allocated for RFID applications generally range in the UHF/ISM band from 864 MHz to 956 MHz (with specific ranges varying by country), but other bands (including low frequency (LF) bands, high frequency (HF) bands, very high frequency (VHF) bands, and ultra-high frequency (UHF) bands) may be allocated for special purpose applications. However, AEPH chips are currently under development that operate over a broader range of frequencies, including, for example, operating in 5G mid-band and high-band frequencies spectrums used by telecommunications network carriers. AEPH chips may be used in inventory control systems and in other applications.

SUMMARY

The present disclosure is directed, in part to user equipment network radio link state management for ambient electromagnetic power harvesting chip reader applications and devices, substantially as shown and/or described in connection with at least one of the Figures, and as set forth more completely in the claims.

One or more of the embodiments presented in the disclosure provide for, among other things, radio link state management services that may be engaged by a multi-purpose user equipment (UE). Such UE can wirelessly communicate both with a communications network (such as a wireless telecommunications network), and an AEPH chip. The embodiments presented herein address the problem of spurious signals, paging, signaling, and/or other function calls to the wireless telecommunications network that may be caused during periods of time when the UE is actively communicating with an AEPH chip using frequencies also used with the wireless telecommunications network. In some embodiments, applications executed on the UE may initiate a suspended UE connection state for data channels of an established radio link with the wireless telecommunications network for a limited duration that permits the UE to complete a communication task with an AEPH chip. When the AEPH communication event is completed, the suspension of the UE connection state may be released to permit the UE to again access services via the wireless telecommunications network.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
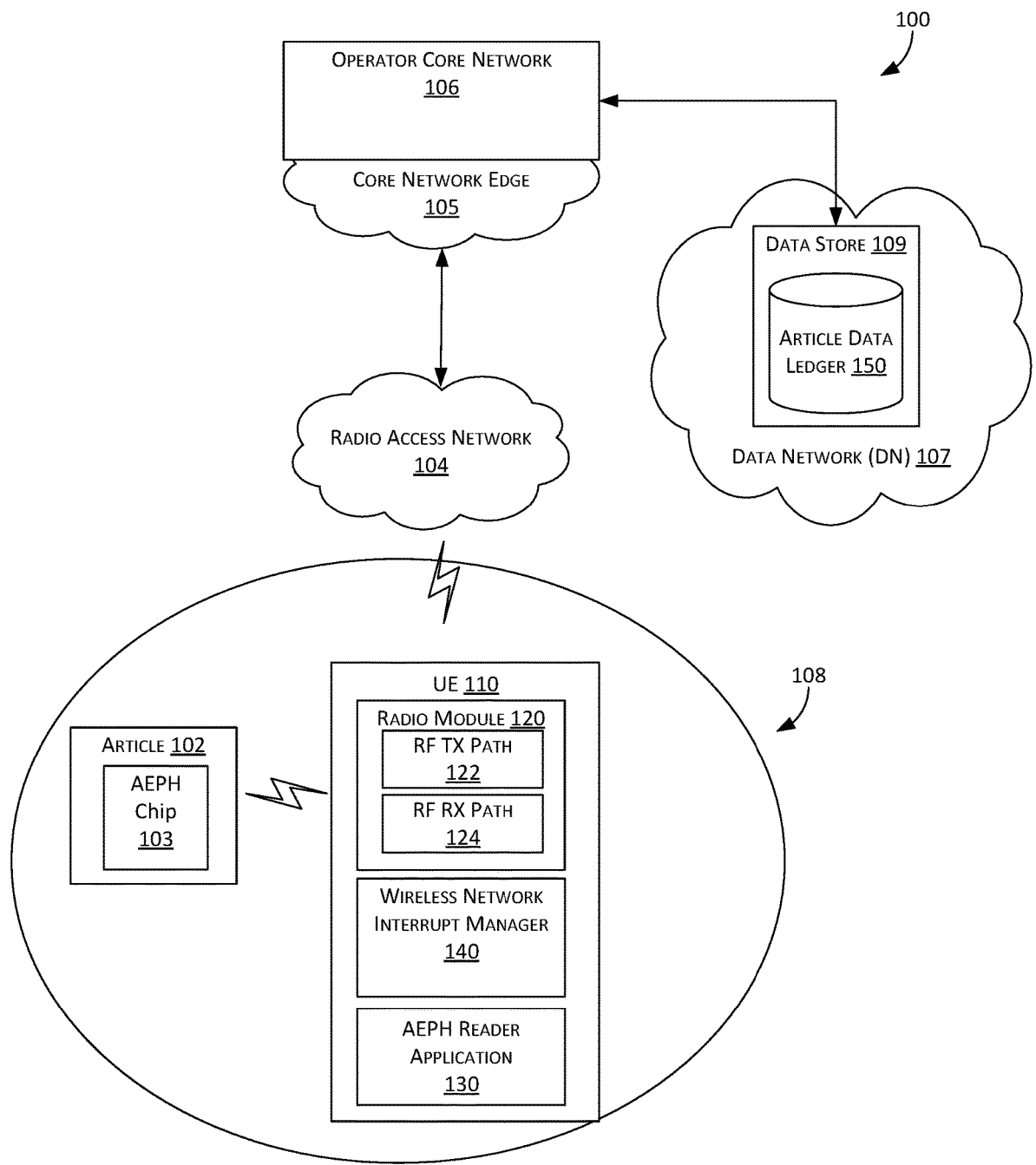
FIG. 1 is a diagram illustrating an example network environment, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

One or more of the embodiments presented in the disclosure provide for, among other things, radio link state management services that may be engaged by a multi-purpose user equipment (UE) that can wirelessly communicate both with a communications network (such as a wireless telecommunications network) and an AEPH chip. In contrast to devices that may use frequency division or similar techniques to inhibit interference between wireless network operations and AEPH chip communications, the UE described herein may use a common set of frequencies to both communicate with a wireless telecommunications network and an AEPH chip. The embodiments presented herein address the problem of causing spurious signals, paging, signaling, and/or other function calls to the wireless telecommunications network during periods of time when the UE is actively communicating with an AEPH chip using frequencies also used with the wireless telecommunications network. More specifically, in some embodiments, one or more applications are executed on the UE that initiate a suspended UE connection state with the wireless telecommunications network for a duration that permits the UE to complete a communication task with the AEPH chip (such as exchanging interrogation and response signals, for example). In some embodiments, suspending the UE connection state the radio link for one or more data channels between the UE and the wireless telecommunications network does not close the communication link established between the UE and the operator core network, but instead institutes a suspended UE connection state with the wherein network traffic transport is paused for a predetermined duration of time sufficient for the UE to complete an AEPH communication events (e.g., to transmit an interrogation signal to the AEPH chip and receive a response signal from the AEPH chip). Once AEPH communication event is completed, the suspension of the UE connection state may be released. In some embodiments, the UE may then proceed to access ledgers or other services available through the wireless telecommunications network using information obtained from the AEPH chip.

Advantageously, embodiments presented herein provide several technical solutions representing advancements over existing technologies. As an example, by using a common set of frequencies to communicate both with a wireless telecommunications network and an AEPH chip, wireless radio frequency (RF) spectrum is being used more efficiently, permitting an expanded range of services to be accomplished within a given frequency band. Moreover, duplication of circuitry on the UE is avoided as the same RF transmit and receive paths may be used to perform both wireless telecommunications and AEPH chip operations, thus avoiding increased device complexity.

FIG. 1 is a diagram illustrating an example network environment 100 embodiment for a wireless communication system. Network environment 100 is but one example of a suitable network environment and is not intended to suggest any limitation as to the scope of use or functionality of the embodiments disclosed herein. Neither should the network environment be interpreted as having any dependency or requirement relating to any one or combination of components illustrated.

As shown in FIG. 1, network environment 100 comprises an operator core network 106 (also referred to as a "core network") that provides one or more network services to one or more UE 110 within a coverage area 108 of at least one radio access network (RAN) 104. In some embodiments, network environment 100 comprises, at least in part, a wireless communications network. In some embodiments, the RAN 104 comprises a radio access network (RAN), often referred to as a cellular base station. The RAN 104 may be referred to as a gNodeB in the context of a 5G New Radio (NR) implementation, or other terminology depending on the specific implementation technology. In some embodiments, the RAN 104 may comprise in part components of a customer premises network, such as a distributed antenna system (DAS) for example. In some embodiments, RAN 104 may comprise a multi-modal network (for example comprising one or more multi-modal access devices) where multiple radios supporting different systems are integrated into the radio RAN 104. Such a multi-modal RAN 104 may support a combination of 3GPP radio technologies (e.g., 4G, 5G and/or 6G) and/or non-3GPP radio technologies. In some embodiment, the RAN 104 may comprise a terrestrial wireless communications base station and/or may be at least in part implemented as a space-based access network (e.g., comprising an Earth orbiting space-based wireless communications base station).

In particular, individual UE 110 may communicate with the operator core network 106 via the RAN 104 over one or both of uplink (UL) RF signals and downlink (DL) RF signals. The RAN 104 may be coupled to the operator core network 106 via a core network edge 105 that comprises wired and/or wireless network connections that may themselves include wireless relays and/or repeaters. In some embodiments, the RAN 104 is coupled to the operator core network 106 at least in part by a backhaul network such as the Internet or other public or private network infrastructure.

Core network edge 105 comprises one or more network nodes or other elements of the operator core network 106 that may define the boundary of the operator core network 106 and may serve as the architectural demarcation point where the operator core network 106 connects to other networks such as, but not limited to RAN 104, the Internet, or other third-party networks. It should be understood that in some aspects, the network environment 100 may not comprise a distinct network operator core 106, but rather may implement one or more features of the network operator core 106 within other portions of the network, or may not implement them at all, depending on various carrier preferences.

As shown in FIG. 1, network environment 100 may also comprise at least one data network (DN) 107 coupled to the operator core network 106 (e.g., via the network edge 105). Data network 107 may include a data store 109 that includes article data ledger 150 as further discussed herein.

Generally, an individual UE 110 may comprise a device capable of unidirectional or bidirectional communication with the RAN 104 via wireless and/or wired communication links. The network environment 100 may be configured for wirelessly connecting UEs 110 to other UEs 110 via the same RAN 104, via other access networks, via other telecommunication networks, and/or to connect UEs to a publicly-switched telecommunication network (PSTN). The network environment 100 may be generally configured for wirelessly connecting a UE 110 to data or services that may be accessible on one or more application servers or other functions, nodes, or servers. The operating environment 100 may be generally configured, in some embodiments, for wirelessly connecting UE 110 to data or services that may be accessible on one or more application servers or other functions, nodes, or servers (such as article data ledger 150 services or other services provided by servers of data network 107).

UE 110 are in general, forms of equipment and machines such as but, not limited to, Internet-of-Things (IoT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, cash registers, turnstiles, security gates, or any other smart device. That said, in some embodiments, UE 110 may include computing devices such as, but not limited to, handheld personal computing devices, cellular phones, smart phones, tablets, laptops, and similar consumer equipment, or stationary desktop computing devices, workstations, servers and/or network infrastructure equipment. As such, the UE 110 may include both mobile UE and stationary UE. The UE 110 can include one or more processors, and one or more non-transient computer-readable media for executing code to carry out the functions of the UE 110 described herein. The computer-readable media may include computer-readable instructions executable by the one or more processors. In some embodiments, the UE 110 may be implemented using a computing device 800 as discussed below with respect to FIG. 8.

As shown in FIG. 1, the UE 110 may communicate with an AEPH chip 103, which may be embedded in, attached to, or otherwise associated with, an article 102. The AEPH chip 103 may store information about that article 102, such as, but not limited to an item identification information (e.g., an item ID), a serial number, model number, or the like. For example, the identification information may include GS1 Identification Numbers, an Electronic Product Code (EPC) or Universal Product Code (UPC) from the AEPH chip 103 for the article 102. An article 102 may comprise any form of object, product, item, consumable good, or may be associated and/or used with an intangible item such as a service. In some embodiments, the AEPH chip 103 comprises an RFID chip.

In FIG. 1, the UE 110 includes a circuit that comprises a radio module circuit 120 (which may be referred to herein as radio module 120) that includes at least a RF transmit (TX) path 122 and a RF receive (RF) path 124. RF TX path 122 may comprise one or more radio circuit components such as, but not limited to, a modulator, digital up-converter, power amplifier, filters, digital-to-analog converters, and/or other related radio components for generating, modulating, and/or wirelessly transmitting RF signals. RF RX path 124 may comprise one or more radio circuit components such as a demodulator, digital down-converter, low-noise amplifier, filters, analog-to-digital converters, and/or other related radio components for receiving and/or demodulating RF signals. The UE 110 may communicate with the operator core network 106 via the RAN 104 over one or both of UL RF signals transmitted by the RF TX path 122 and DL RF signals received via the RF RX path 124.

UE 110 may further comprise an AEPH reader application 130 which may be used for communicating with at least one AEPH chip 103 using the radio module 120. That is, the AEPH reader application 130 may communicate with the AEPH chip 103 over RF interrogation signals transmitted by the RF TX path 122 and RF response signals received by the RF RX path 124. In some embodiments, the RF TX path 122 and RF RX path 124 are used by the AEPH reader application 130 to transmit RF signal bursts to the AEPH chip 103 and to receive RF signal bursts from the AEPH chip 103. In some embodiments, the RF TX path 122 and RF RX path 124 are used by the AEPH reader application 130 to establish a bidirectional communications link with the AEPH chip 103. Although AEPH reader application 130 is generally discussed herein in the context of operating to read data from the AEPH chip 103, it should be understood that the AEPH reader application 130, in some embodiments, may also operate to write data to the AEPH chip 103.

In some embodiments, the AEPH chip 103 may include power management and other functionalities that perform different task and/or operations when exposed to different levels of available ambient EM power at different frequencies. An example of such an AEPH chip 103 may be found in U.S. Pat. No. 11,258,302 "Ambient electromagnetic power harvesting chip adaptation based on available power level", granted Feb. 22, 2022, which is incorporated herein by reference in its entirety. However, it should be understood that this is just an example and in other embodiments, the AEPH reader application 130 may work in conjunction with other AEPH chips.

The UE 110 shown in FIG. 1 includes, amongst other components, a wireless network interrupt manager 140 which may be coupled to the AEPH reader application 130. In some embodiments, the wireless network interrupt manager 140 may be, at least in part, integrated with the AEPH reader application 130 and/or integrated with the radio module 120. In some embodiments, if the UE 110 uses a subscriber identity module (SIM) card or eSIM, then the wireless network interrupt manager 140 may be, at least in part, integrated with the SIM card or eSIM for the UE 110. In some embodiments, the UE 110 may not include a SIM nor an eSIM, but may include an encrypted object that operates as a virtual SIM. The virtual SIM may comprise code that is executed by a processor to carry out one or more functions of a SIM and/or eSIM. Where the UE 110 operates using a virtual SIM, the functions described herein of the wireless network interrupt manager 140 may be, at least in part, integrated with the virtual SIM.

As discussed above, in some cases, the AEPH reader application 130 may use the radio module 120 to communicate with the AEPH chip 103 via interrogation signals and response signals that are in a same frequency channel used by the UE 110 to carry UL radio RF signals and/or DL RF signals for communicating with the RAN 104. For example, in some embodiments, a UE 110 may use a spectrum band, such as one or more of 2.5 GHz, 3.45-3.55 GHz, 3.7-3.98 GHz, 28 GHz, 39 GHz, and/or 47 GHz 5G frequency bands for example, to carry signals to the RAN 104, and also for exchanging interrogation signals and response signals with an AEPH chip 103.

In some embodiments, the AEPH reader application 130 may notify the wireless network interrupt manager 140 prior to the transmission of an interrogation signal to the AEPH chip 103 in order to initiate a wireless network interrupt to suspend the radio link for one or more data channels between the UE 110 and the RAN 104. As discussed below, suspending the radio link for one or more data channels between the UE 110 and the RAN 104 does not close the communication link established between the UE 110 and the operator core network 106, but instead institutes a suspended UE connection state with the RAN 104 and/or operator core network 106 wherein network traffic is paused for a duration of time sufficient for the AEPH reader application 130 to transmit an interrogation signal to the AEPH chip 103, and receive a response signal from the AEPH chip 103 (e.g., which is typically on the order of about 5 milliseconds). After the predetermined duration, the wireless network interrupt manager 140 may resume a UE connection state with the RAN 104 and/or operator core network 106 so that the transport of network traffic is restored. In some embodiments, the AEPH reader application 130 may indicate to the wireless network interrupt manager 140 one or both of the RF frequency of the interrogation signal and the expected RF frequency of any response signals. Based on these indications, the wireless network interrupt manager 140 may determine which radio links (data channels), if any, may be in conflict with the RF frequency of the AEPH chip 103 interrogation signal and/or expected response signals, and initiate a wireless network interrupt to suspend the radio link for those data channels. For example, if the UE 110 currently is operating with data channels in the 2.5 GHz and 47 GHz frequency bands, and the interrogation signal and/or expected response signals are in the 2.5 GHz band, then the wireless network interrupt manager 140 may initiate a wireless network interrupt to suspend the radio link for the 2.5 GHz band data channels while leaving the 47 GHz unaffected. Similarly, if the UE 110 currently is operating with data channels in the 2.5 GHz and 47 GHz frequency bands, and the interrogation signal and/or expected response signals are in the 1900 MHz band, then the wireless network interrupt manager 140 may determine that no initiation of a wireless network interrupt is necessary to avoid a conflict (e.g., RF interference) and the radio links for the 2.5 GHz and 47 GHz band data channels unaffected. As discussed in greater detail below, in some embodiments the wireless network interrupt manager 140 may utilize one or more standard defined functions of the operator core network 106 to implement the suspended UE connection state of radio link data channels between the UE 110 and the RAN 104 and/or operator core network 106, such as by requesting the operator core network 106 to activate a radio resource control (RRC) Inactive state for the UE 110, and requesting the operator core network 106 to resume an RRC Connected state after the specified interrupt duration has elapsed.

In some embodiments, after the predetermined duration expires and the wireless network interrupt is released, the AEPH reader application 130 may query the data store 109 (or other network resource) via RAN 104 based on the response signal received from the AEPH chip 103. For example, the AEPH reader application 130 may request information from the article data ledger 150 pertaining to the article 102 based on identification data or other information read from (e.g., received from) the AEPH chip 103 by the AEPH reader application 130.

The AEPH reader application 130 may communicate (for example, via RAN 104) with at least one server application hosted by a server that hosts the data store 109. In some embodiments, the article data ledger 150 may be hosted by a back-end application for tracking and/or providing information about article 102 (such as, but not limited to, product information, inventory information, packaging information, user instructions, maintenance information, service history, for example). As an example, article data ledger 150 may comprise an enterprise GS1 Standards supply chain and/or inventory management application. In some embodiments, the article data ledger 150 may be implemented as a ledger that comprises, for example, information relating the article 102 with AEPH chip 103, and/or other information retrievable based on information read from the AEPH chip 103 by the AEPH reader application 130. The article data ledger 150 may comprise, for example, a distributed ledger technology (DLT), a Hyperledger technology, and/or a blockchain technology, for example.

The AEPH reader application 130 may read identification information, such as but not limited to, one or more GS1 Identification Numbers, from the AEPH chip 103 that is relevant to the article 102. Such identification information may include, for example, trade item information, supply chain partner information, product serial numbers, product batch/lot numbers, logistic information such as container codes, or similar product related information. Based on the identification information, the AEPH reader application 130 may further query the article data ledger 150 to obtain additional information about the article 102, and/or to carry out and record an operation using the AEPH chip 103. In some embodiments, the article data ledger 150 may comprise a distributed ledger that itself comprises one or more smart contracts that one or more functions of the AEPH reader application 130 interact with directly. In some embodiments, the AEPH reader application 130 may selectively configure the radio module 120 to transmit different configurations of RF signals to the AEPH chip 103 in order activate, power, and interact with the AEPH chip 103, and in order to perform different task and/or operations.

Figure 2:
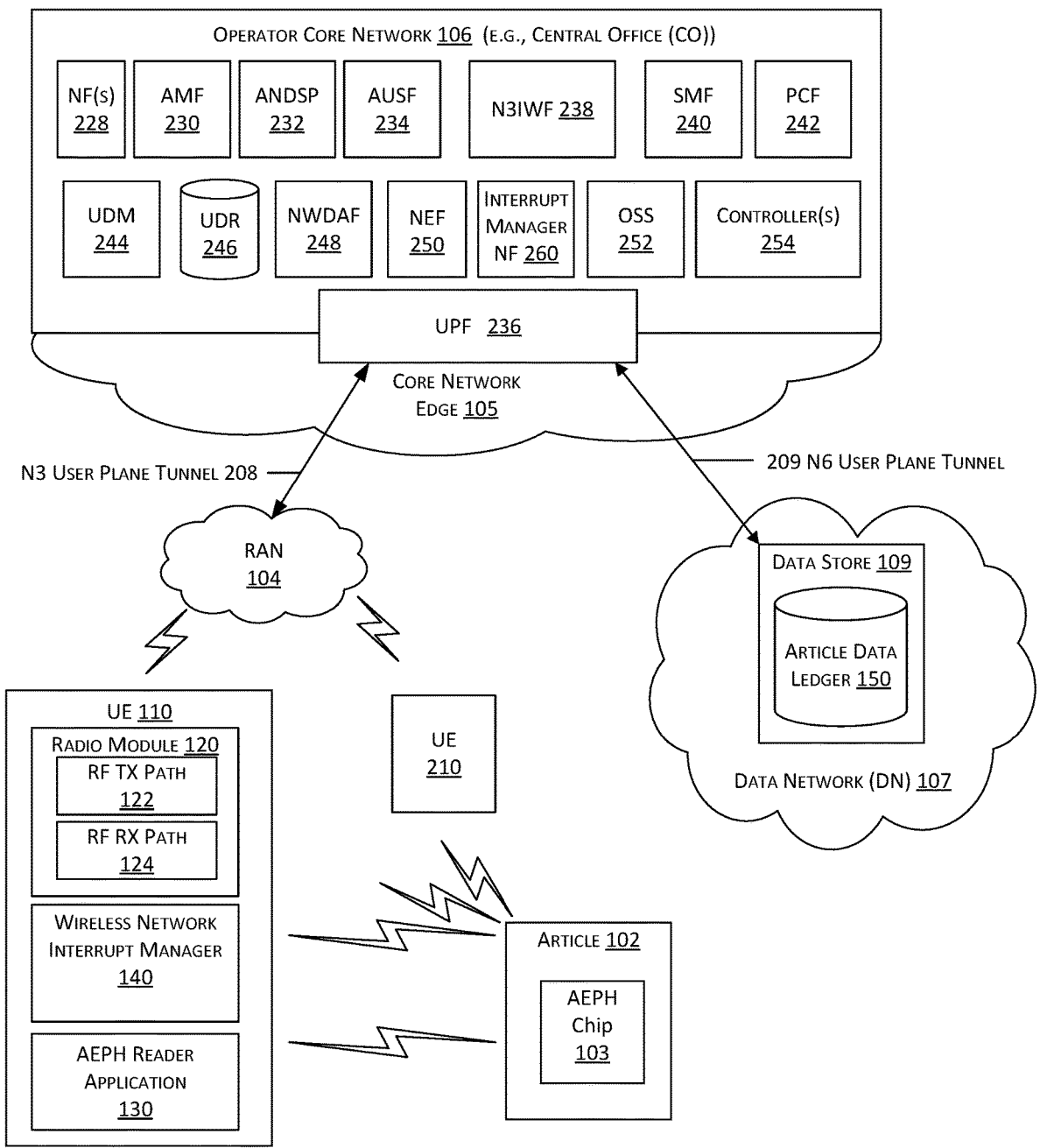
FIG. 2 is a diagram illustrating an example implementation of an operator core network for a networking environment, in accordance with some embodiments described herein.

Referring now to FIG. 2, FIG. 2 illustrates an example implementation of the networking environment 100 of FIG. 1. In some implementations, the operator core network 106 may comprise modules, also referred to as network functions (NFs), generally represented in FIG. 2 as NF(s) 228.

Such network functions may include, but are not limited to, one or more of a core access and mobility management function (AMF) 230, an access network discovery and selection policy (ANDSP) 232, an authentication server function (AUSF) 234, a user plane function (UPF) 236, non-3GPP Interworking Function (N3IWF) 238, a session management function (SMF) 240, a policy control function (PCF) 242, unified data management (UDM) 244, an unified data repository (UDR) 246, Network Data Analytics Function (NWDAF) 248, a network exposure function (NEF) 250, and an operations support system (OSS) 252. Implementation of these NFs of the operator core network 106 may be executed by one or more controllers 254 on which these network functions are orchestrated or otherwise configured to execute utilizing processors and memory of the one or more controllers 254. The NFs may be implemented as physical and/or virtual network functions, container network functions, and/or cloud-native network functions. As shown in FIG. 2, the operator core network 106 may include an interrupt manager network function 260 which may operate in conjunction with the UE 110 (for example, with wireless network interrupt manager 140 of the UE 110) to manage wireless network interrupt requests for suspended UE connection states. In some embodiments, the functions of the interrupt manager network function 260 described herein may be performed at least in part by one or more of the other network functions of the operator core network 106.

Notably, nomenclature used herein is used with respect to the 3GPP 5G architecture. In other aspects, one or more of the network functions of the operator core network 106 may take different forms, including consolidated or distributed forms that perform the same general operations. For example, the AMF 230 in the 3GPP 5G architecture is configured for various functions relating to security and access management and authorization, including registration management, connection management, paging, and mobility management; in other forms, such as a 4G architecture, the AMF 230 of FIG. 2 may take the form of a mobility management entity (MME). The operator core network 106 may be generally said to authorize rights to and facilitate access to an application server/service such as provided by application function(s) requested by any of the UE 110. In some embodiments, the at least one data network (DN) 107 may be coupled to the operator core network 106, for example via the network edge 105.

As shown in FIG. 2, UPF 236 represents at least one function of the operator core network 106 that extends into the core network edge 105. In some embodiments, the RAN 104 is coupled to the UPF 236 within the core network edge 105 by a communication link that includes an N3 user plane tunnel 208. For example, the N3 user plane tunnel 208 may connect a cell site router of the RAN 104 to an N3 interface of the UPF 236. In some embodiments, interrupt manager network function 260 may be a network function coupled to the UPF 236 and communicates with the wireless network interrupt manager 140 of the UE 110 through the UPF 236. In some embodiments, the article data ledger 150 may be implemented at least in part by at least one data store 109 within DN 107. The data store 109 and/or article data ledger 150 may be coupled to the UPF 236 in the core network edge 105 by a N6 user plane tunnel 209. For example, the N6 user plane tunnel 209 may connect a network interface (e.g., a switch, router and/or gateway) of the DN 107 to an N6 interface of the UPF 236. In some embodiments, the article data ledger 150 and/or data store 109 may be implemented at least in part as a component of the operator core network 106.

The AMF 230 facilitates mobility management, registration management, and connection management for 3GPP devices such as a UE 110. ANDSP 232 facilitates mobility management, registration management, and connection management for non-3GPP devices. AUSF 234 may receive authentication requests from the AMF 230 and interacts with UDM 244, for example, for SIM authentication and/or to authenticate a UE 110 based on another device ID. N3IWF 238 provides a secure gateway for non-3GPP network access, which may be used for providing connections for UE 110 access to the operator core network 106 over a non-3GPP access network. SMF module 240 facilitates initial creation of protocol data unit (PDU) sessions using session establishment procedures. The PCF 242 maintains and applies policy control decisions and subscription information. Additionally, in some aspects, the PCF 242 maintains quality of service (QoS) policy rules. For example, the QoS rules stored in a unified data repository (UDR) 246 can identify a set of access permissions, resource allocations, or any other QoS policy established by an operator. In some embodiments, the PCF 242 maintains subscription information indicating one or more services and/or micro-services subscribed to by each UE 110. Such subscription information may include subscription information pertaining to a subscription for access to the article data ledger 150. The UDM 244 manages network user data including, but not limited to, data storage management, subscription management, policy control, and core network 106 exposure. NWDAF 248 collects data (for example, from UE, other network functions, application functions and operations, administration, and maintenance (OAM) systems) that can be used for network data analytics. The OSS 252 is responsible for the management and orchestration of the operator core network 106, and the various physical, virtual network functions, container network functions, controllers, compute nodes, and other elements that implement the operator core network 106.

Some aspects of operating environment 100 include the UDR 246 storing information relating to access control and service and/or micro-service subscriptions. The UDR 246 may be configured to store information relating to such subscriber information and may be accessible by multiple different NFs in order to perform desirable functions. For example, the UDR 246 may be accessed by the AMF 230 in order to determine subscriber information pertaining the UE 110, accessed by a PCF 242 to obtain policy related data, accessed by NEF 250 to obtain data that is permitted for exposure to third party applications (such as AEPH application 130 executed by a UE 110, for example). Other functions of the NEF 250 include monitoring of UE related events and posting information about those events for use by external entities, and providing an interface for provisioning UEs (via PCF 242) and reporting provisioning events to the UDR 246. Although depicted as a unified data management module, UDR 246 can be implemented as a plurality of network function (NF) specific data management modules.

The UPF 236 is generally configured to facilitate user plane operation relating to packet routing and forwarding, interconnection to a data network (e.g., DN 107), policy enforcement, and data buffering, among other operations. Using network slicing (e.g., using 5G software-defined networking (SDN) and/or 5G network slice selection function (NSSF)), the UPF 236 may establish a dedicated network slice for one or more data channels of the UE 110 that act as, in essence, as a distinct network (for example, establishing its own QoS, provisioning, and/or security) within the same physical network architecture of the core network edge 105. For example, in different implementations, a UE 110 may be assigned a network slick such as an Enhanced Mobile Broadband (eMBB) 5G network slice, a Massive Machine Type Communications (MMTC) 5G network slice, an Ultra-Reliable Low Latency Communication (URLLC) 5G network slice, or a Public Safety (PS) 5G network slice.

As mentioned above, the operator core network 106 may include an interrupt manager network function 260 which may operate in conjunction with the UE 110 (for example, with wireless network interrupt manager 140 of the UE 110) to manage wireless network interrupt requests for suspended UE connection states. For example, as discussed below with respect to FIG. 6, the interrupt manager network function 260 may receive a network interrupt request message from the UE 110 to initiate a suspended UE connection state for one or more one or more data channels. The interrupt manager network function 260 may respond to the network interrupt request message by activating the requested network interrupt and the suspended UE connection state. For example, in some embodiments, the interrupt manager network function 260 may send a radio link suspend command message to the RRC protocol stack layer to place one or more of the UE 110's data channels in a suspended UE connection state (such as by initiating an RRC Inactive mode for the UE 110, for example using a "RRC Release configured for suspendConfig" message). The RRC protocol is used on the air interface between the UE 110 and RAN 104 to perform functions such as connection establishment and release, radio bearer (RB) establishment, reconfiguration and release, RRC connection mobility procedures, paging notification and release as well as other functions. Through the use of signaling functions, the RRC protocol stack layer may be used to configure the user plane and control plane, for example to implement Radio Resource Management strategies. As an example, using the RRC protocol stack layer, the interrupt manager network function 260 may trigger switching of the UE 110 from RRC Connected to RRC Inactive (e.g. based on a radio link suspend command from the interrupt manager network function 260).

While the radio link for the selected data channels may then be suspended, in some embodiments, logical signaling link to the AMF 230 in the operator core network 106, as well as a user data tunnel to the UPF 236 remain established. While in this suspended UE connection state the UE 110 may transmit and receive RF signals with the AEPH chip 103 using the RF paths of the radio module 120 without causing spurious signals, paging, signaling, and/or other function calls to propagate through the uplink path of the RAN 104 to the operator core network 106. Signal received on those suspended data channels may be effectively ignored by the RAN 104.

In some embodiments, after a specified interrupt duration expires, the interrupt manager network function 260 may restore the UE connection state so that UE 110 connectivity with the operator core network 106 is resumed. For example, in some embodiments, the interrupt manager network function 260 may send a radio link resume command message to the radio resource control (RRC) protocol stack layer to place the UE 110's data channels back into an active UE connection state (such as by re-initiating an RRC Connect mode for the UE 110) For example, the RAN 104 may respond to the radio link resume command by triggering switching of the UE 110 from RRC Inactive to RRC Connect. In some embodiments, after the interrupt duration expires, the UE 110 may trigger switching of the UE 110 from RRC Inactive to RRC Connect. In some embodiments, the interrupt manager network function 260 may be at least in part implemented as a component of the RAN 104 such that the RAN 104 interacts with the wireless network interrupt manager 140 to suspended and restore the UE connection state for UE 110.

The interrupt manager network function 260 may, in some embodiments, monitor for the presence of one or more other UE(s) (such as UE 210) within a proximity of the UE 110 (e.g., within a predetermined proximity or distance threshold). That is, while the wireless network interrupt manager 140 may initiate suspending of the UE connection state for UE 110, other UE such as UE 210, may also be adversely affected if they operate on the same frequencies as UE 110 and AEPH chip 103 are using to communicate. The AEPH reader application 130 may control the radio module 120 to adjust the transmit power of interrogation signals to the AEPH chip 103 to limit the effective range of the interrogation signals. However, some UE 210 may still be within a range to be affected by the interrogation and/or response signals. In some embodiments, therefore, the interrupt manager network function 260 may determine when one or more other UE 210 are within a predetermined distance of the UE 110, and when the interrupt manager network function 260 receives the wireless network interrupt request from the wireless network interrupt manager 140 of UE 110, the interrupt manager network function 260 may further send a radio link suspend command message to the RRC protocol stack layer to additionally place one or more data channels for UE(s) 210 within the predetermined distance in a suspended UE connection state for the interrupt duration. While in the suspended UE connection state, those UE(s) 210 will also avoid triggering spurious signals, paging, signaling, and/or other function calls to the RAN 104 and/or the operator core network 106 due to the communication between the UE 110 and AEPH chip 103.

In some embodiments, an interrupt duration may be a set duration specified by a default value (e.g., a timeout value from 10 to 100 milliseconds), which may be based on an expected round-trip delay corresponding to the elapsed time from transmitting an interrogation signal to the AEPH chip 103, to receiving a response signal from the AEPH chip 103. In some embodiments, the interrupt duration may be an adjustable duration. For example, the network interrupt request message generated by the wireless network interrupt manager 140 may specify to the interrupt manager network function 260 the interrupt duration. In some embodiments, a requested interrupt duration may be determined by the AEPH reader application 130 based on the type of task the AEPH reader application 130 is performing with the AEPH chip 103. For example, simply requesting the AEPH chip 103 to return its ID information or other information from memory may take a relatively small amount of time, and the AEPH chip 103 may inform the wireless network interrupt manager 140 to request a relatively small interrupt duration (e.g., first level or default duration) that would envelope the time to complete that task. Another task, may require the AEPH chip 103 to perform computations that consume more time that merely returning information from memory. In that case, the AEPH chip 103 may inform the wireless network interrupt manager 140 to request a relatively higher interrupt duration (e.g., second level duration) that would envelope the time to complete that more complex task.

In some embodiments, the network interrupt request message may further include an indication of the frequencies and/or frequency bands that the AEPH reader application 130 will be using exchange interrogation signals and response signals with the AEPH chip 103 so that the interrupt manager network function 260 can suspended UE connection states for UE 110 radio links (and/or UE 210 radio links) corresponding to those frequencies and/or frequency bands.

Figure 3A:
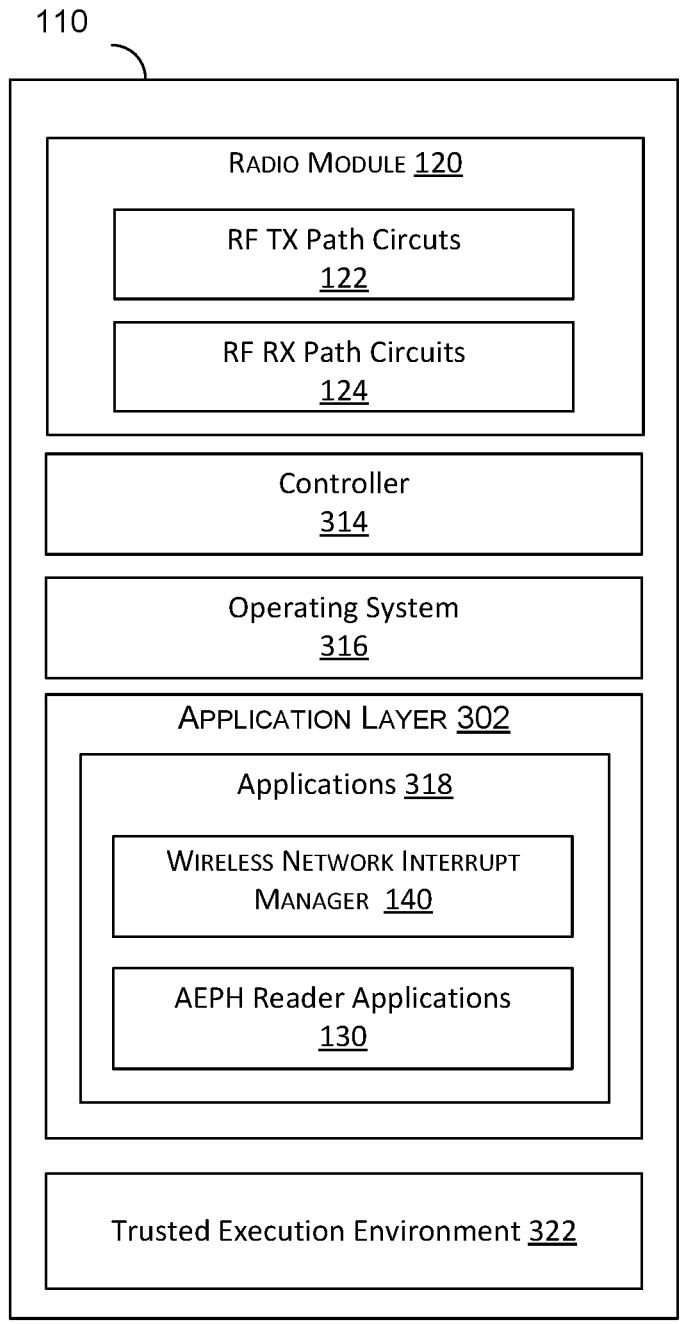
FIG. 3A is a diagram illustrating an example user equipment comprising an AEPH reader, in accordance with some embodiments described herein.

With reference now to FIG. 3A, FIG. 3A illustrates an example UE 110, more specifically a UE 110 that executes one or more elements of an AEPH reader such as the UE 110 of FIGS. 1 and 2. Although some UE's may include other components, generally UE 110 includes at least one radio module 120 that includes one or more RF transmit (TX) path 122 circuits, one or more RF receive (RX) path 124 circuits, and a controller 314. Configuration of the RF TX path 122 and/or RF RX path 124 may be controlled by the radio module 120, for example based on commands from the operating system 316 or other applications executed on the controller 314. Tn some embodiments one or both of the TX path circuits 122 and/or RF RX path 124 may comprise a plurality of RF paths, each corresponding to different frequency bands.

In the embodiment shown in FIG. 3A, the UE 110 includes operating system 316 and one or more executable applications 318 that are executed by the controller 314 to implement the one or more functions of the UE 110 described herein. Generally a UE 110 includes at least application layer 302 and may include a trusted execution environment (TEE) 322. The application layer 302 facilitates execution of the UE 110 operating system 316 and executables (including applications 318). In other words, the application layer 302 provides the direct user interaction environment for the UE 110. TEE 322 facilitates a secure area of the processor(s) of UE 110. That is, TEE 322 provides an environment in the UE 110 where isolated execution and confidentiality features are enforced. Example TEEs that may be used for UE 110 include, but are not limited to, Arm TrustZone technology, Software Guard Extensions (SGX) technology, Reduced Instruction Set Computer—Five (RISC-V), or similar technologies. For example, the application layer 302 may comprise AEPH reader application(s) 130 and/or the wireless network interrupt manager 140. In this embodiment, an application layer 302 facilitates execution of the UE operating system 316 and applications 318, which may include, but are not limited to, the AEPH reader application(s) 130, the wireless network interrupt manager 140 and other applications that initiate tasks and perform transactions with the AEPH chip 103.

In some embodiments, application layer 302 may include applications executed in a rich environment and/or applications executed in the TEE 322. The AEPH reader application(s) 130 and wireless network interrupt manager 140 may be implemented at least in part by trustlets resident on the UE 110, protected from tempering or manipulation by a hardware Root of Trust and hosted from the TEE 322. Generally, computer readable code executed in the TEE 322 is referred to as a "trustlet". A trustlet can securely access data stored memory of the UE 110 that is otherwise inaccessible in the application layer 302. A trustlet may take the form of trusted processes, secure processes, isolated user mode (TUM) processes, or the like. For example, a trustlet executed in TEE 322 can access system level data (that is, data related to the larger machine the UE 110 in incorporated within), private and/or public keys, and similar data stored, or accessed, by the UE 110. Trustlets can be activated in response to various network or UE operations. For example, a trustlet can be activated by execution of an associated application in the application layer 302. For another example, a trustlet can be activated in response to a command generated by a network (e.g., network operator core 106 of FIG. 1) and communicated to the UE 110. The trustlet(s) activated may vary depending on the service requested. For example, a first trustlet may be activated in response to a voice service. A second trustlet may be activated in response to a messaging service. A third trustlet may be activated in response to a data service that facilitates a telemetry update.

Similarly, the trustlet(s) activated may vary within a particular type of service. For example, a fourth trustlet may be activated to support the function of the AEPH reader application 130 and/or wireless network interrupt manager 140. Specifically with respect to radio link state management services, the AEPH reader application 130 may activate one or more AEPH trustlets (such as AEPH trustlet(s) 340) that interact with a wireless network interrupt trustlet (such as wireless network interrupt trustlet 348) to control UE connection state suspension and/or suspension release functions. For example, by receiving UE connection state suspension and/or suspension release requests from the AEPH trustlet(s) 340 at the wireless network interrupt trustlet 348, the wireless network interrupt manager 140 may be sure that requests to modify the UE connection state of a radio link and/or one or more of its data channels, are originating from a trusted source that is authorized to make such requests. In some embodiments, AEPH trustlet(s) 340 and/or wireless network interrupt trustlet 348 may be activated by the AEPH reader application 130 when an ambient electromagnetic power harvesting (AEPH) chip communication event is pending.

Upon activation, a trustlet performs a set of predetermined operations. The operations can include, but are not limited to: accessing data stored by the UE, (such as a set keys that are embedded directly into a processor or microcontroller during manufacturing, certificates of authority, unique device identifiers, or any other data); monitoring operations of the UE (such as monitoring processor load, microcontroller load, activation of other UE systems, or other similar UE operations); access or monitor operations of other applications executed by the UE; writing data to the memory of UE; activate another trustlet; or any combination thereof.

Figure 3B:
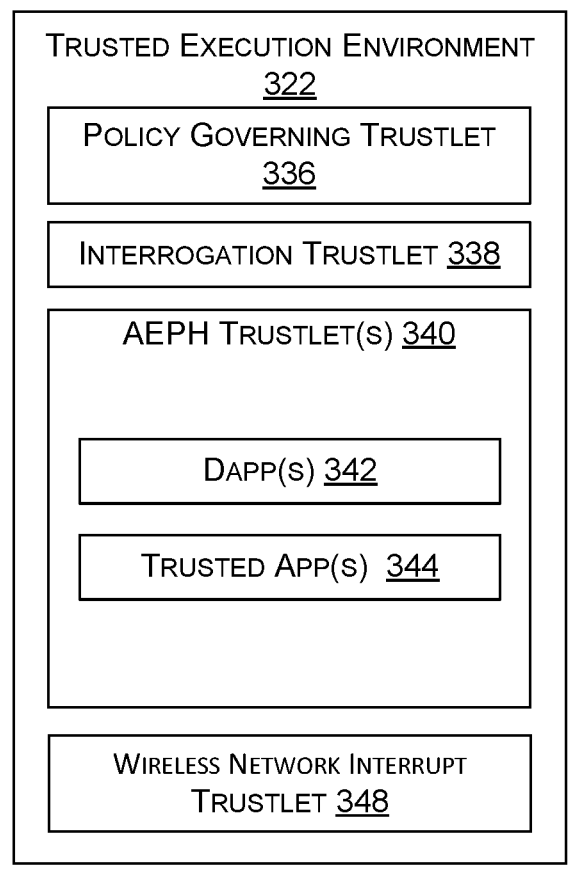
FIG. 3B is a diagram illustrating an example trusted execution environment for a user equipment comprising an AEPH reader, in accordance with some embodiments described herein.

Referring now to FIG. 3B, As depicted, TEE 322 illustratively may include a policy governing trustlet 336, an interrogation trustlet 338, one or more AEPH trustlets 340 and/or a wireless network interrupt trustlets 348. In other embodiments, a TEE 322 may include a fewer or greater number of trustlets.

Policy governing trustlet 336 corresponds to an illustrative example of computer readable code that is activated in response to execution of an application or operation. Upon activation, policy governing trustlet 336 may access a locally stored set of keys corresponding to the application and the UE's processor. Such keys may be utilized for establishing a secured communication link 236 between the AEPH reader application 130 and AEPH chip 103 or other secured transactions. Additionally, policy governing trustlet 336 may access a UE's unique device identifier (device ID). The policy governing trustlet 336 may communicate the accessed data to a communication network for analysis.

In some embodiments, the device ID may comprise an International Mobile Equipment Identity (IMEI) identifier and/or a Mobile Equipment Identifier (MEID). The IMEI may be stored in a subscriber identity module (SIM) card or embedded SIM (eSIM) of the UE 110 and transmitted to the operator core network 106 as part of the process to authenticate the UE 110. In some embodiments, a device ID may comprise one or more elements of an integrated circuit card identifier (ICCID), a permanent equipment identifier (PEI), mobile subscriber international subscriber directory number (MSISDN), mobile subscription identification number (MSIN), International mobile subscriber identity (IMSI), mobile country codes (MCC), subscription permanent identifier (SUPI), mobile network codes (MNC), and/or other identifier. In some embodiments, the device ID may comprise one of more decentralized identifiers (DIDs), such as World Wide Web Consortium (W3C) DIDs for example. In some embodiments, a device ID comprises a DID that resolves to a DID document. The DID document may be stored at a data registry (e.g., a verifiable data registry). For example, a DID may include a Universal Resource Identifier (URI) that associates a UE 110 (as a DID subject) with a DID document. The DID may include, for example, cryptographic public keys that the UE 110 may use to authenticate itself with the operator core network 106 and/or the interrupt manager network function 260, and prove its association with the DID (e.g., the device ID). In some embodiments, the device ID may be based on a self-sovereign identity (SSI) paradigm where the UE 110 may present its device ID to the operator core network 106, which may verify that the device ID was issued from a trusted issuer. In some embodiments, a device ID may comprise a combination of identifiers such as any of those described herein. The device ID may comprise a combination of hardware identifiers, network address identifiers, serial numbers, component identifiers (e.g., CPU IDs), and/or other identifiers such a as discussed herein. In some embodiment a device ID may be managed (using a Dapp, crypto wallet, or the like, for example) and verified using public-key cryptography in conjunction with a distributed ledger. For example, in some embodiment the device ID for a UE 110 may be generated by back-end blockchain ledger and downloaded to the UE 110.

Interrogation trustlet 338 corresponds to an illustrative example of computer readable code that is activated in response to a command from the communication network. An interrogation trustlet can be activated by a command that is generated in response to a determination that UE 110 is an unknown device or that the UE provided anomalous data for a requested network service. In response to activation, an interrogation trustlet 338 may activate other trustlets, access additional data, or perform any other trustlet operation. The interrogation trustlet 338 may communicate the accessed data to a network function of the operator core network 106. For example, interrogation trustlet 338 can be activated in response to a command that a network function 228 or server application from a server on data network 107 has requested data from one or more trustlets executed in the trusted execution environment 322. In some embodiments, one or more of the AEPH trustlets 340 (discussed below) are activated by the interrogation trustlet 338 in response to a command from a server application and/or based on instructions received by communicating with the article data ledger 150.

The AEPH trustlets 340 corresponds to an illustrative example of computer readable code that may be activated in conjunction with initiation of communications between the AEPH reader application 130 and an AEPH chip 103. AEPH trustlets 340 may also include one or more decentralized applications 342, also known as Dapps. Dapps 342 typically operate on a blockchain or network of peer-to-peer computers. In some embodiments, Dapps 342 comprise applications that engage directly with the article data ledger 150. In some embodiments, the Dapps 342 utilize smart contracts to complete transactions between AEPH chip 103 and the article data ledger 150 or other distributed ledger or blockchain based ledger. Likewise, one or more of the Dapps 342 can exchange information with the article data ledger 150 based on information exchanged with the AEPH chip 103. In some embodiments, one or more of the Dapps 342 may be remotely loaded to the TEE 322, for example by another server application from a server on DN 107. Dapps 342 may thus be activated in conjunction with operations performed with the AEPH chip 103 and/or operations performed with the article data ledger 150. Other trusted applets 344 may also be executed as AEPH trustlets 340 to perform one or more secure operations between the AEPH reader application 130 and the AEPH chip 103.

Wireless network interrupt trustlet 348 corresponds to an illustrative example of computer readable code that may be activated in conjunction with managing the UE connection state of one or more channels of a radio link between the UE 110 and RAN 104. In some embodiments, the wireless network interrupt trustlet 348 may be a component of the wireless network interrupt manager 140. The wireless network interrupt trustlet 348 may communicate with the AEPH trustlets 340 to coordinate management of the UE connection state with AEPH chip communication events. For example, the wireless network interrupt trustlet 348 may determine when an AEPH chip communication event is pending based on a notification from the AEPH trustlets 340 and/or AEPH reader application 130. That is, a determination that an AEPH chip communication event is pending indicates that the AEPH reader application 130 intends to initiate transmission of an interrogation signal to the AEPH chip 103, is expecting to receive a response signal from the AEPH chip 103, or is otherwise expecting to communicate via RF signals with the AEPH chip using the radio module 120 of the UE 110. Based on the determination that the AEPH chip communication event is pending, the wireless network interrupt manager 140 may initiate a wireless network interrupt to suspend the radio link for one or more data channels between the UE 110 and the RAN 104, as described herein. By triggering wireless network interrupt requests based on requests from the AEPH trustlets 340, may ensure that network interrupts are only initiated based on trusted information. In some embodiments, the functions of the AEPH trustlet(s) 340 and wireless network interrupt trustlet 348 may be integrated together in a combined trustlet.

Figure 4:
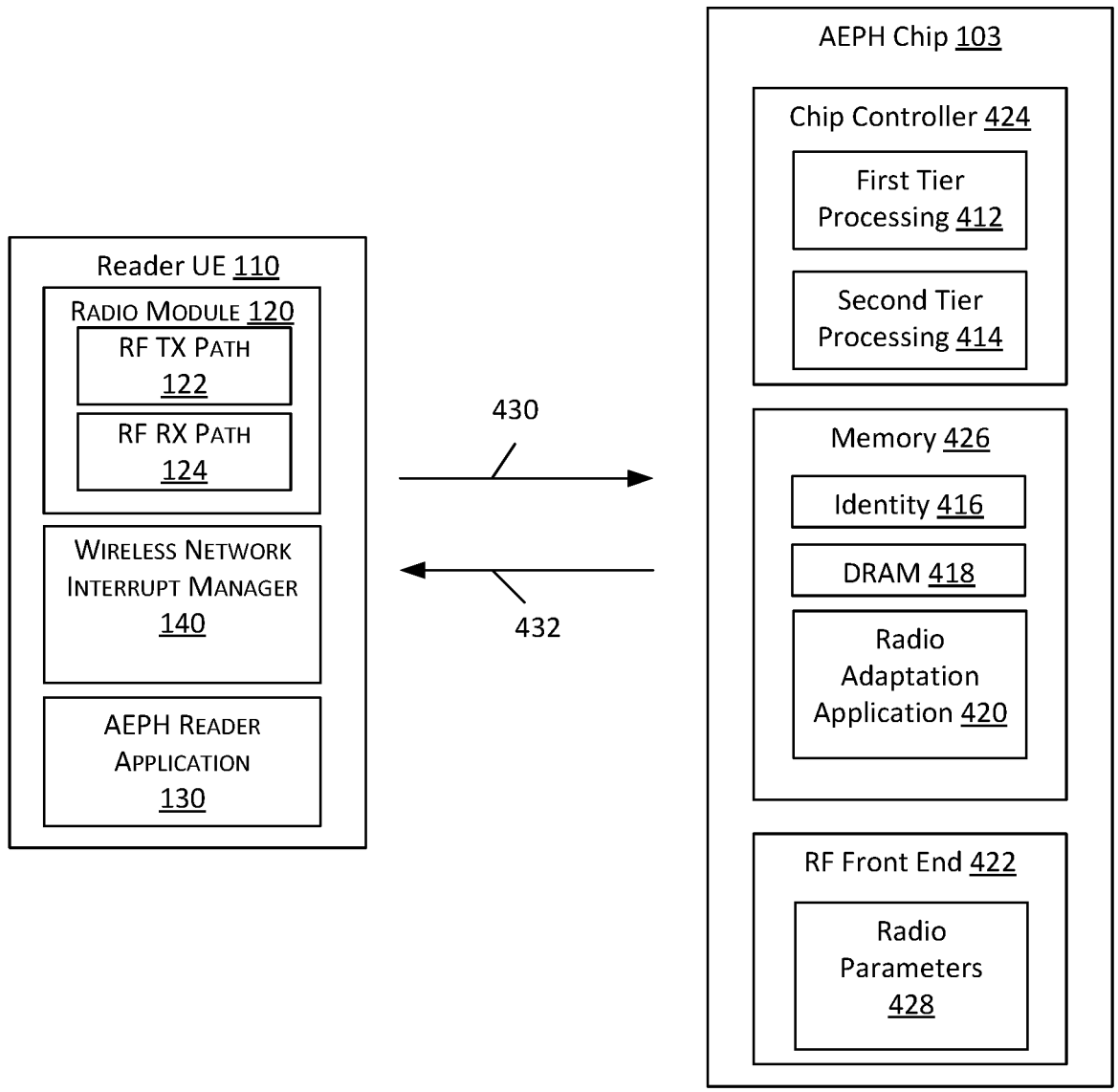
FIG. 4 is a diagram illustrating example user equipment communicating with an AEPH chip, in accordance with some embodiments described herein.

Turning now to FIG. 4, FIG. 4 illustrates an example AEPH chip 103 that may be used in conjunction with the AEPH reader application 130 in accordance with embodiments of this disclosure. In an embodiment, the AEPH chip 103 comprises chip controller 424 (e.g., comprising one or more processors or processor cores), memory 426, and an RF front end 422 (e.g., radio circuitry). In some embodiments, in a first mode of operation, the AEPH chip 103 harvests power from a relatively low-power ambient electromagnetic power field emitted as an electromagnetic (EM) RF signal 430 from the radio module 120 RF TX path 122. The AEPH Reader Application may configure the radio module 120 to produce one or more interrogation signals 430 in a frequency band such as, but not limited to, 2.5 GHz 5G frequency band, a 47 GHz frequency band, a 900 MHz frequency band, a 1.9 GHz Industrial, Scientific, and Medical (ISM) frequency band, a 2.4 GHz ISM frequency band and/or other 3GPP 5G, Industrial, Scientific, and/or Medical (ISM) frequency bands. Although the EM signals exchanged between the UE 110 and AEPH chip 103 are generally described herein in the context of wireless EM signals, embodiments are not so limited. It should be understood that in some embodiments, EM signals exchanged between the UE 110 and AEPH chip 103 may be carried by electrical conductors. AEPH chip 103 harvests power from the interrogation signal 430 to power components of the AEPH chip 103.

When the interrogation signal 430 comprises a low-power signal (e.g., at a first power level) the functionality of the AEPH chip 103 may be restricted. For example, only a first tier processing 412 of the chip controller 424 may be active, or only an identity 416 stored in the memory 426 may be accessible and may not be writeable (other parts of the memory 426 may not be readable or writeable in the first tier of operation). For example, the RF front end 422 may support transmitting one or more response signals 432 (e.g., carrying the identity 416 or other response). However, in this low-power operation, the response signal 432 may only be transmitted at a low data rate.

In a second mode of operation, the interrogation signal 430 comprises a medium-power or high-power signal (e.g., at a second power level). In response, the AEPH chip 103 may harvests a greater amount of power from the medium-power or high-power interrogation signal 430. When the AEPH chip 103 harvests a greater amount of power from the interrogation signal 430, the functionality of the AEPH chip 103 may not be restricted and additional functionality may be operational. For example, in addition to the first tier of processing 412, the chip controller 424 may further provide a second tier of processing 414. In addition to the identity 416, a dynamic random access memory (DRAM) 418 may be activated and be readable and writeable in the second mode of operation of the AEPH chip 103. DRAM 418 may provide support for some of the second tier processing 414, for example by permitting the chip controller 424 to load instructions from a non-transitory memory portion of the memory 426 into the DRAM 418 and executing the instructions by the chip controller 424 out of the DRAM 418.

In some embodiments, a radio adaptation application 420 stored in the memory 426 may be accessible and may be executed in the second tier of processing 414 of the chip controller 424, for example by virtue of loading at least some of the radio adaptation application 420 into the DRAM 418 by the chip controller 424 and executing those instructions out of DRAM 418. The AEPH reader application 130 may control RF parameters of the interrogation signals 430 transmitted by the radio module 120 such that a low power interrogation signals 430 is transmitted at a power level commensurate with completing tasks for the first tier processing 412 and such that a medium-power or high-power interrogation signals 430 is transmitted at a power level commensurate with completing tasks for the second tier processing 414.

Moreover, in some embodiments, first tier processing 412 and second tier processing 414 are each respectively activated by ambient EM power fields of different respective frequencies. For example, first tier processing 412 may be responsive to a low-power interrogation signal 430 in the 1900 MHz ISM band, while second tier processing 414 may be responsive to a medium-power or high-power interrogation signal 430 in the 2.5 GHz band. The AEPH reader application 130 may control the radio module 120 such that the low-power interrogation signal 430 is transmitted at a first frequency that the first tier processing 412 is responsive to, and medium-power or high-power interrogation signal 430 is transmitted at a second frequency that the second tier processing 412 is responsive to. In this way, activation of various different processing tasks by the AEPH chip 103 may be selectively triggered by the AEPH reader application 130 by controlling the Radio Module 120 to emit EM signals of various combinations of both power levels and frequencies. In some embodiments, the AEPH reader application 130 may notify the wireless network interrupt manager 140 of the frequency of the interrogation signal 430 and/or the frequency of the expected response signal 432 and the wireless network interrupt manager 140 may initiate a wireless network interrupt to suspend the radio link for one or more data channels between the UE 110 and the RAN 104 based on those frequencies (for example, by including in the network interrupt request message an indication of the frequency of the interrogation signal 430 and/or the frequency of the expected response signal 432).

Although FIG. 4 illustrates an AEPH chip 103 wherein first and second processing tiers may be selectively activated based on the RF configuration of the interrogation signal 430 signal, it should be understood that in other embodiments, the AEPH reader application 130 may interact similarly with AEPH chips 104 comprising any number of processing tiers.

Figure 5:
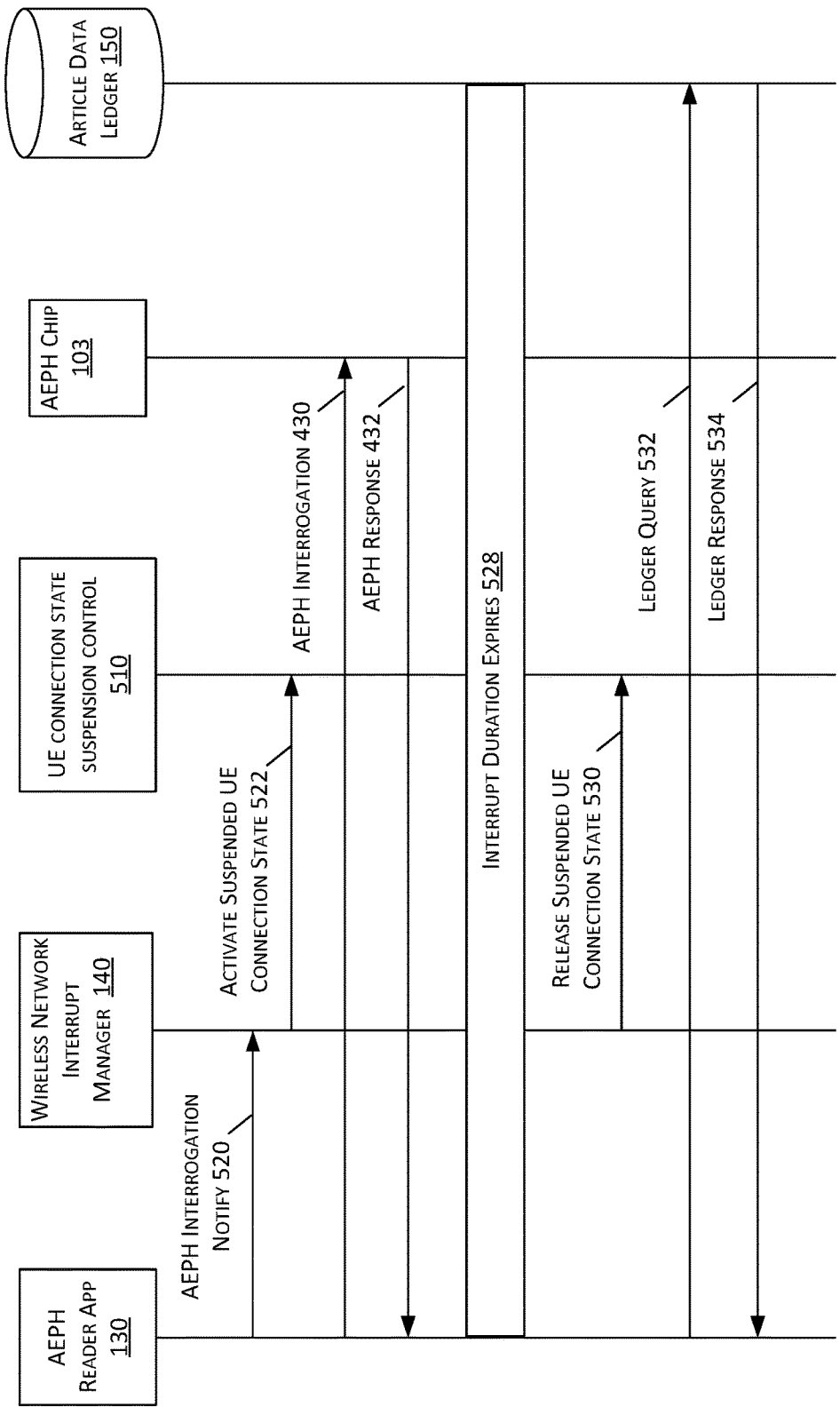
FIG. 5 is an event flow diagram illustrating user equipment network radio link state management, in accordance with some embodiments described herein.

Referring now to FIG. 5, FIG. 5 is an event flow diagram illustrating an example initiation of a wireless network interrupt to suspend the radio link for one or more data channels between the UE 110 and the RAN 104. As shown at 520, the AEPH reader app 130 of the UE 110 notifies the wireless network interrupt manager 140 of an imminent AEPH chip 103 communication event, and may further notify the wireless network interrupt manager 140 of the planned interrogation signal frequency and/or expected response signal frequency. The wireless network interrupt manager 140 may determine whether the planned interrogation signal frequency and/or expected response signal frequency are frequencies overlapping with a frequency band of a wireless telecommunications radio link with the RAN 104. If not, then the AEPH reader app 130 may proceed with interacting with the AEPH chip 103 without initiating a wireless network interrupt with the RAN 104. If there is a potential overlap between the interrogation/response signal frequencies and the frequency band in use for the wireless telecommunications radio link, then the wireless network interrupt manager 140 may activate a suspended UE connection state (shown at 522) for the radio link of the affected frequency band via UE connection state suspension control 510. UE connection state suspension control 510 may be implemented in a variety of ways. For example, in some embodiments, the wireless network interrupt manager 140 may communicate a network interrupt request message to an interrupt manager network function 260, or other network function of the operator core network 106 to suspend the UE connection state or otherwise place the UE 110 radio link in an inactive mode. With the UE connection state suspended, the AEPH reader app 130 can operate the radio module 120 to transmit an AEPH interrogation signal 430 and receive an AEPH response signal 432 broadcast by one or more AEPH chips 104 responding to the AEPH interrogation signal 430. At 528, the wireless network interrupt duration expires. The wireless network interrupt manager 140 may release the suspension of the UE connection state (shown at 530) for the radio link of the affected frequency band via UE connection state suspension control 510. For example, the wireless network interrupt manager 140 may communicate a restoration message to the interrupt manager network function 260, or other network function of the operator core network 106 to release (e.g., remove) the suspension of the UE connection state or otherwise place the UE 110 radio link back into an active mode. The UE 110 may then resume communication over the radio link with the RAN 104 and/or operator core network 106. For example, in some embodiments, based on information received from the AEPH response from the AEPH chip 103, the AEPH reader app 130 may send a ledger query 532 to the article data ledger 150 and receive a ledger response 534 from the article data ledger 150 comprising information about the article 102 associated with the AEPH chip 103. That is, if the UE 110 on which the AEPH reader application 130 accesses the operator core network 106 uses one or more frequencies that are also used with the AEPH chip 103, then the UE may wait for the expiration of the wireless network interrupt duration 528 and then proceed to use a re-activated data channel. In some embodiments, if the UE 110 also has access to one or more other frequencies to communication with operator core network 106 that are not used with the AEPH chip 103, then the UE 110 may shift over to those one or more other frequencies to communicate with the operator network core 106 until the expiration of the wireless network interrupt duration 528.

Figure 6:
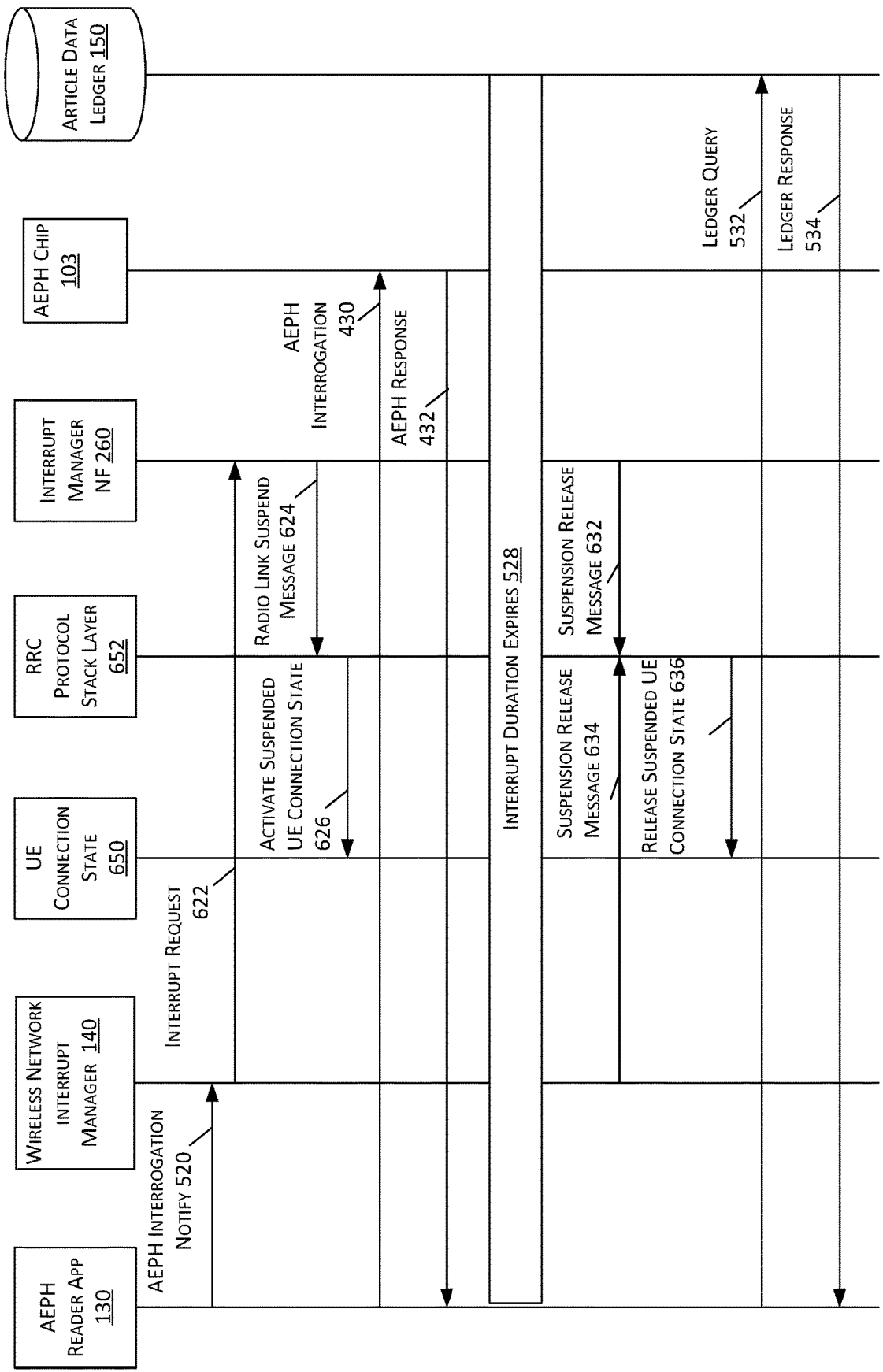
FIG. 6 is another event flow diagram illustrating user equipment network radio link state management, in accordance with some embodiments described herein.

Referring now to FIG. 6, FIG. 6 is another event flow diagram illustrating an example initiation of a wireless network interrupt to suspend the radio link for one or more data channels between the UE 110 and the RAN 104. In this embodiment, as shown at 520, the AEPH reader app 130 of the UE 110 notifies the wireless network interrupt manager 140 of an imminent AEPH chip 103 communication event, and may further notify the wireless network interrupt manager 140 of the planned interrogation signal frequency and/or expected response signal frequency.

The wireless network interrupt manager 140 may determine whether the planned interrogation signal frequency and/or expected response signal frequency are frequencies overlapping with a frequency band of a wireless telecommunications link with the RAN 104. If not, then the AEPH reader app 130 may proceed with interacting with the AEPH chip 103 without initiating a wireless network interrupt with the RAN 104. If there is a potential overlap between the interrogation/response signal frequencies and the frequency band in use for the wireless telecommunications link, then the wireless network interrupt manager 140 may send an interrupt request (shown at 622) to the interrupt manager network function 260.

The interrupt manager network function 260 may initiate activating a suspended UE connection state for the UE 110 by sending a radio link suspend message 624 to the RRC protocol stack layer 652. The RRC protocol stack layer 652 activates a suspended UE connection state (shown at 626) of a UE connection state 650 for the radio link of the affected frequency band. Activating a suspended UE connection state for the radio link may be implemented in a variety of ways. For example, in some embodiments, in some embodiments, the interrupt manager network function 260 may send a radio link suspend command message to the radio resource control (RRC) protocol stack layer 652 to place the UE 110's data channels in a suspended UE connection state (such as by initiating an RRC Inactive mode for the UE 110, for example using a "RRC Release configured for suspendConfig" message). The RAN 104 may respond to the radio link suspend command message by switching the UE 110 from RRC Connected to RRC Inactive. With the UE connection state suspended, the AEPH reader app 130 can operate the radio module 120 to transmit an AEPH interrogation signal 430 and receive an AEPH response signal 432 broadcast by one or more AEPH chips 104 responding to the AEPH interrogation signal 430.

At 528, the wireless network interrupt duration expires. In some embodiments, releasing the suspension of the UE connection state may be triggered from the operator network core 106, such as by an radio link suspension release message 632 communicated from the interrupt manager NF 260 to the RRC protocol stack layer 652. Alternatively, in some embodiments, releasing the suspension of the UE connection state may be triggered from the UE 110, such as by a radio link suspension release message 634 communicated from the wireless network interrupt manager 140 to the RRC protocol stack layer 652. The RRC protocol stack layer 652 responds by releasing the suspended UE connection state (shown at 636) of a UE connection state 650 for the radio link of the affected frequency band. The UE 110 may then resume communication over the radio link with the RAN 104 and/or operator core network 106. For example, in some embodiments, based on information received from the AEPH response from the AEPH chip 103, the AEPH reader app 130 may send a ledger query 532 to the article data ledger 150 and receive a ledger response 534 from the article data ledger 150 comprising information about the article 102 associated with the AEPH chip 103.

In various embodiments such as one or more of those described herein, the network interrupt duration (e.g., at 528) may be a set duration of time such as a predefined default value (e.g., from 10 to 100 milliseconds), and/or an adjustable time duration (e.g., as determined or assigned by the AEPH reader application 130). In some embodiments, the expiration of wireless network interrupt duration may be event driven, or otherwise programmatically determined. For example the expiration of the wireless network interrupt duration may be triggered on receiving the AEPH response 432 at the AEPH reader app 130. In other embodiments, when the AEPH reader app 130 is initialized, an interrupt manager network function 260 may be notified to begin looking for wireless network interrupt requests from that UE 110, and programmatically determine the wireless network interrupt duration 528 based on information from, or otherwise pertaining to, the AEPH reader app 130.

Figure 7:
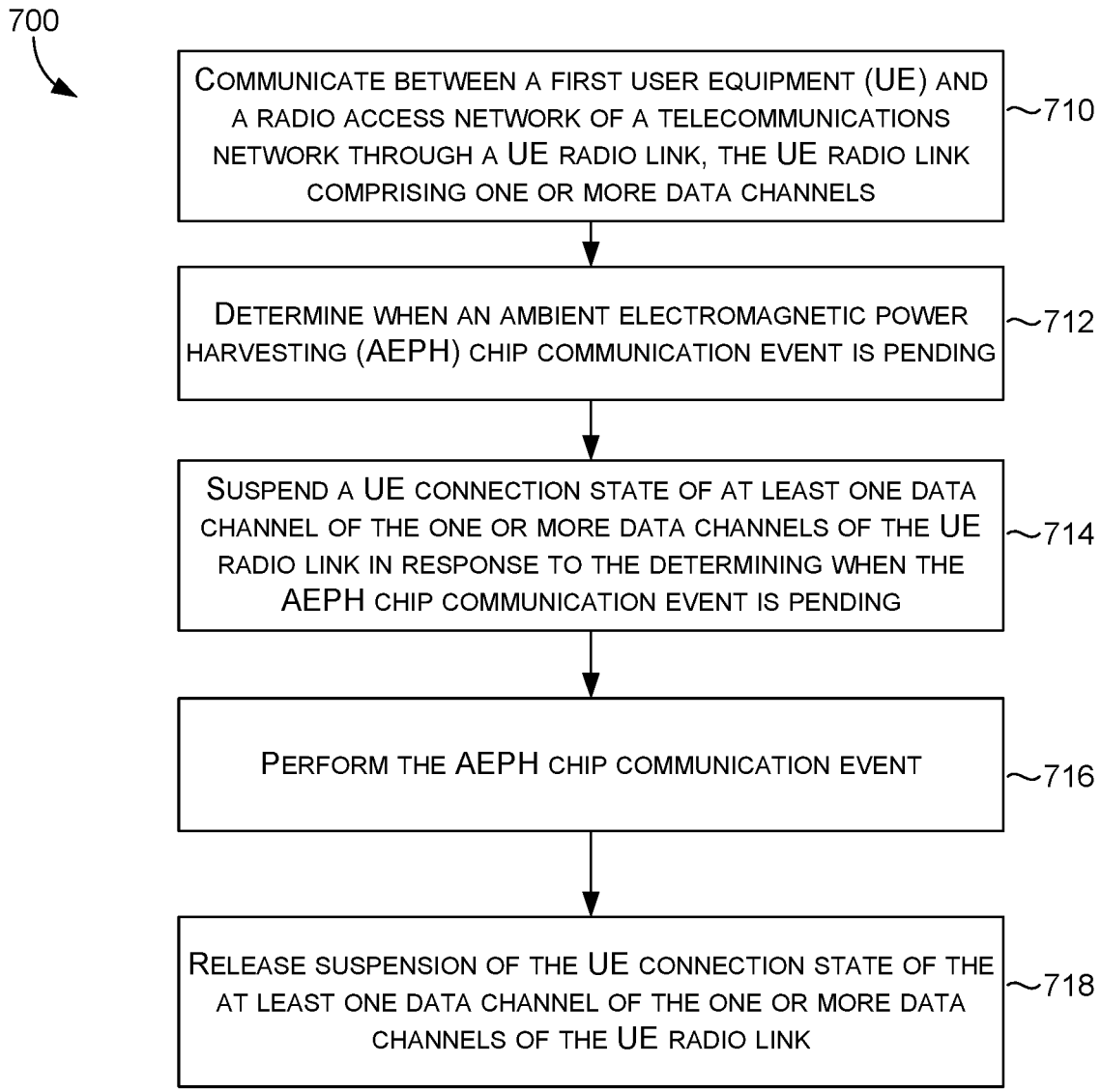
FIG. 7 is a flow chart illustrating an example method for user equipment network radio link state management in accordance with some embodiments described herein.

FIG. 7 is a flow chart illustrating a method 700 for user equipment network radio link state management, according to one embodiment. It should be understood that the features and elements described herein with respect to the method of FIG. 7 may be used in conjunction with, in combination with, or substituted for elements of, any of the other embodiments discussed herein and vice versa. Further, it should be understood that the functions, structures, and other descriptions of elements for embodiments described in FIG. 7 may apply to like or similarly named or described elements across any of the figured and/or embodiments described herein and vice versa. In some embodiments, elements of method 700 are implemented utilizing one or more processing units of a UE 110 as disclosed above.

The method 700 at 710 includes communicating between a first user equipment (UE) and a radio access network (RAN) of a telecommunications network through a UE radio link, the UE radio link comprising one or more data channels. Individual UE, such as the first UE, may communicate with an operator core network of the telecommunication network via the RAN over one or both of UL RF signals and DL RF signals (such as illustrated with respect to FIGS. 1 and 2). The RAN may be coupled to the operator core network via a core network edge that comprises wired and/or wireless network connections that may themselves include wireless relays and/or repeaters. In some embodiments, the RAN is coupled to the operator core network at least in part by a backhaul network such as the Internet or other public or private network infrastructure. In some embodiments, the radio link comprises a 5G New Radio (NR) wireless air interface radio link and/or a layer 2 radio link protocol (RLP) based wireless communication link. The first UE may include a circuit defining a radio module that includes at least a RF transmit (TX) path and a RF receive (RF) path for establishing, maintaining, and using, the radio link.

The method 700 at 712 includes determine when an ambient electromagnetic power harvesting (AEPH) chip communication event is pending. In some embodiments, an AEPH reader application executing on the first UE may notify the wireless network interrupt manager prior to the transmission of an interrogation signal to the AEPH chip in order to initiate a wireless network interrupt to suspend the radio link for one or more data channels between the first UE and the RAN. For example, a wireless network interrupt trustlet, and/or other application of the first UE, may determine when an AEPH chip communication event is pending based on a notification (e.g., such as a message or data received from the AEPH trustlets and/or AEPH reader application. A determination that an AEPH chip communication event is pending indicates that the AEPH reader application intends to initiate transmission of an interrogation signal from the first UE to the AEPH chip, is expecting to receive a response signal from the AEPH chip, and/or is otherwise expecting to communicate via RF signals with the AEPH chip using the radio module of the UE. Based on the determination that the AEPH chip communication event is pending, the wireless network interrupt manager, for example, may initiate a wireless network interrupt to suspend the radio link for one or more data channels between the first UE and the RAN 104.

The method 700 at 714 includes suspending a UE connection state of at least one data channel of the one or more data channels of the UE radio link in response to the determining that the AEPH chip communication event is pending. Suspending the UE connection state of the radio link for one or more data channels between the first UE and the RAN does not close the communication link established between the UE and the operator core network, but instead institutes a suspended UE connection state wherein network traffic is paused for a predetermined duration of time sufficient for the AEPH reader application to transmit an interrogation signal to the AEPH chip and receive the expended response signal from the AEPH chip (e.g., which is typically on the order of about 5 milliseconds). In some embodiments the wireless network interrupt manager may utilize one or more standard defined functions of the operator core network to implement the suspended UE connection state of radio link data channels, such as by requesting the operator core network to activate an RRC Inactive state for the first UE, and/or requesting the operator core network to resume an RRC Connected state after an interrupt duration has elapsed.

While one or more data channels of the radio link may then be place in a suspended connection state, in some embodiments, logical signaling link to the AMF in the operator core network, as well as a user data tunnel to the UPF may remain established during the suspended UE connection state. While in this suspended UE connection state the UE may transmit and receive RF signals with the AEPH chip using the RF paths of the radio module without causing spurious signals, paging, signaling, and/or other function calls to propagate through the uplink path of the RAN to the operator core network.

In some embodiments, when the UE connection state the data channel of UE radio link is suspended, the UE may switch (e.g., for the duration of the suspended UE connection state) to a second UE radio link with the RAN that operates on a different frequency and/or frequency band than those used to communicate with the AEPH chip. In some embodiments, therefore, an interrupt manager network function may determine when one or more other UE are within a predetermined distance of the first UE, and when the interrupt manager network function receives a wireless network interrupt request from the first UE, the interrupt manager network function may additionally place the data channels for the other UE within the predetermined distance in a suspended UE connection state for the interrupt duration.

The method 700 at 716 includes performing the AEPH chip communication event. For example, as discussed with respect to FIG. 4, the AEPH reader application of the first UE may exchange various communications with a AEPH chip for various purposes, through interrogation signals (which are transmitted by the radio module of the UE and received by the radio front end of the AEPH chip) and response signals (which are transmitted by the radio front end of the AEPH chip and received by the radio module of the UE). The interrogation signals and/or response signals may radiated from the UE and AEPH chip respectively using a data channel in a frequency band such as, but not limited to, a 2.5 GHz 5G frequency band, a 47 GHz frequency band, a 900 MHz frequency band, a 1.9 GHz ISM frequency band, a 2.4 GHz ISM frequency band and/or other 3GPP 5G, Industrial, Scientific, and/or Medical (ISM) frequency bands. In some embodiments, the AEPH reader application may control RF parameters of the interrogation signals transmitted by the radio module, such as the frequency and/or power level of the interrogation signals.

The method 700 at 718 includes releasing suspension of UE connection state of the at least one data channel of the one or more data channels of the UE radio link. For example, after the specified interrupt duration expires, the suspension of the UE connection state with the RAN and/or operator core network is released and normal network traffic flow is restored. In some embodiments, the AEPH reader application may indicate to the wireless network interrupt manager one or both of the RF frequency of the interrogation signal and the expected RF frequency of any response signals. Based on these indications, the wireless network interrupt manager may determine which radio links (data channels), if any, may be in conflict with the RF frequency of the AEPH chip interrogation signal and/or expected response signals, and initiate a wireless network interrupt to suspend the radio link for those data channels based on the specified interrupt duration. As previously discussed, the interrupt duration may be a set duration of time such as a predefined default value (e.g., from 10 to 100 milliseconds), and/or an adjustable time duration (e.g., as determined or assigned by the AEPH reader application), event driven, and/or programmatically determined.

In some embodiments, based on information received from the AEPH chip, the AEPH reader application may query or perform other operations with a ledger using the at least one data channel after release of suspension of the UE connection state. For example, as discussed herein, a data network may include a data store that includes article data ledger that includes information about an article or service associated with the AEPH chip. The article data ledger may be hosted by a back-end application for tracking and/or providing information about article the (such as products, inventory, packages, for example). The article data ledger may comprise, for example, at least one of a distributed ledger technology (DLT), a Hyperledger technology, or a blockchain technology. The article data ledger, when implemented as a distributed ledger, may comprise a blockchain based distributed ledger such as, but not limited to, a HyperLedger for example.

As an example use case, in some embodiments, AEPH chips (such as AEPH chip 103) may be embedded, for example, in various articles in a room (such as a hotel room, for example), such as sheets, towels, pillows, electronics, artwork, and the like. The AEPH chips may individually include a device ID that refers back to a ledger (on a server and/or data store of a data network) that contains information about the article the AEPH chip is associated with. For example, an AEPH chip in an article of artwork may refer back to a ledger that may provide information about the artwork such as the artists, when the artwork was created, and so forth. An AEPH chip in an article of electronics may refer back to a ledger that may provide user instructions and/or access to services that can be obtained using the electronics. An AEPH chip in a fabric article (such as sheets, towels, pillows, etc.) may refer back to a ledger that may provide information on the last time those articles were laundered and/or replaced. A user in the room wishing to access one or more of the various information available from the AEPH chips may open the AEPH reader application on their UE (e.g., a smart phone or tablet). Prior to initiating communications with the AEPH chips, the AEPH reader application may inform a wireless network interrupt manager on the UE of the pending AEPH chip communication event, and in some embodiments the frequencies (and/or frequency bands) of the interrogation signals and expected response signals. The wireless network interrupt manager may determine whether the UE is communicating with a radio access network using those frequencies (and/or frequency bands) and if so, initiate a wireless network interrupt to suspend a UE connection state for one or more one or more data channels of the open radio link in use for communicating with the radio access network. The AEPH reader application may then proceed with the AEPH chip communication event, exchanging interrogation signals and response signals with the AEPH chip(s) until the network interrupt duration expires. Once the suspend a UE connection state is subsequently released after the network interrupt duration expires, the AEPH reader application may query the ledger, or perform other operations with the ledger via the radio link, based on information obtained by communicating with the AEPH chip(s).

Figure 8:
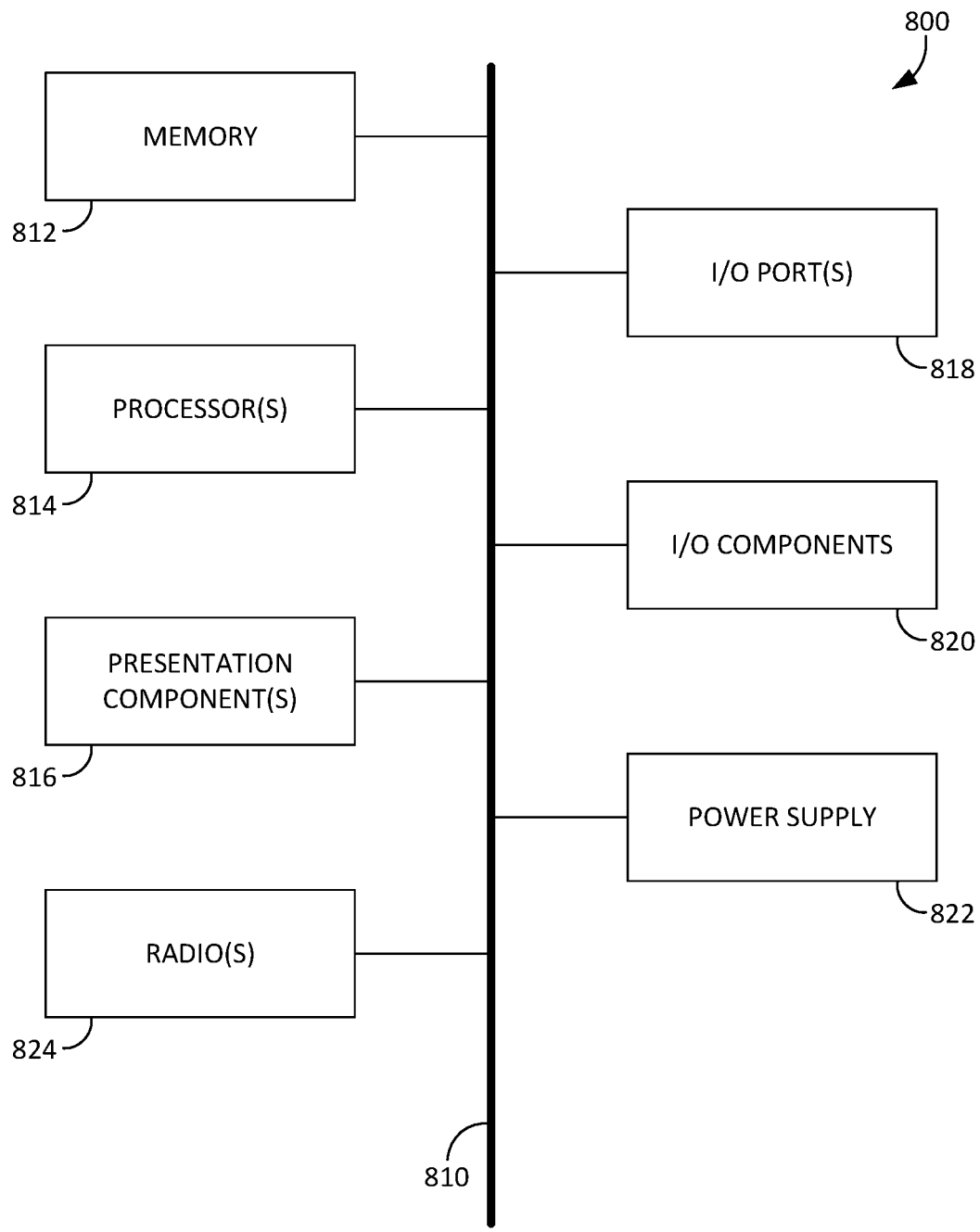
FIG. 8 is an example computing device, in accordance with some embodiments described herein.

Referring to FIG. 8, a diagram is depicted of an exemplary computing environment suitable for use in implementations of the present disclosure. In particular, the exemplary computer environment is shown and designated generally as computing device 800. Computing device 800 is but one example of a suitable computing environment and is not intended to suggest any limitation as to the scope of use or functionality of the embodiments described herein. Neither should computing device 800 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, computing device 800 includes bus 810 that directly or indirectly couples the following devices: memory 812, one or more processors 814, one or more presentation components 816, input/output (I/O) ports 818, I/O components 820, power supply 822, and radio 824. Bus 810 represents what may be one or more busses (such as an address bus, data bus, or combination thereof). The devices of FIG. 8 are shown with lines for the sake of clarity. However, it should be understood that the functions performed by one or more components of the computing device 800 may be combined or distributed amongst the various components. For example, a presentation component such as a display device may be one of I/O components 820. In some embodiments, the UE 110 may comprise a computing device 800. In some embodiments, the interrupt manager network function 260 may be implemented on a network node of network operator core 106 that may comprise a computing device 800. The processors of computing device 800, such as one or more processors 814, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "computer" or "computing device." In some embodiments, a interrupt manager network function 260, wireless network interrupt manager 140, AEPH reader application 130, or other components of the UE 110, RAN 104, operator core network 105, or other components as described in any of the examples of this disclosure may be implemented at least in part by code executed by the one or more processors(s) 814. The article data ledger 150 may be stored or otherwise implemented at least in part by memory 812.

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media and computer-readable media do not comprise a propagated data signal or signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. Memory 812 may be removable, non-removable, or a combination thereof. Exemplary memory includes solid-state memory, hard drives, optical-disc drives, etc. Computing device 800 includes one or more processors 814 that read data from various entities such as bus 810, memory 812 or I/O components 820. One or more presentation components 816 presents data indications to a person or other device. Exemplary one or more presentation components 816 include a display device, speaker, printing component, vibrating component, etc. I/O ports 818 allow computing device 800 to be logically coupled to other devices including I/O components 820, some of which may be built in computing device 800. Illustrative I/O components 820 include a microphone, joystick, game pad, satellite dish, scanner, printer, wireless device, etc.

Radio(s) 824 represents a radio that facilitates communication with a wireless telecommunications network. For example, radio(s) 824 may be used to establish communications with components of the access network 104, operator core network 106 and/or core network edge 105. Illustrative wireless telecommunications technologies include CDMA, GPRS, TDMA, GSM, and the like. In some embodiments, the radio(s) 824 comprise circuits that implement the radio module 120 of UE 110 described herein. Radio 824 might additionally or alternatively facilitate other types of wireless communications including Wi-Fi, WiMAX, LTE, and/or other VoIP communications. As can be appreciated, in various embodiments, radio(s) 824 can be configured to support multiple technologies and/or multiple radios can be utilized to support multiple technologies. A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Figure 9:
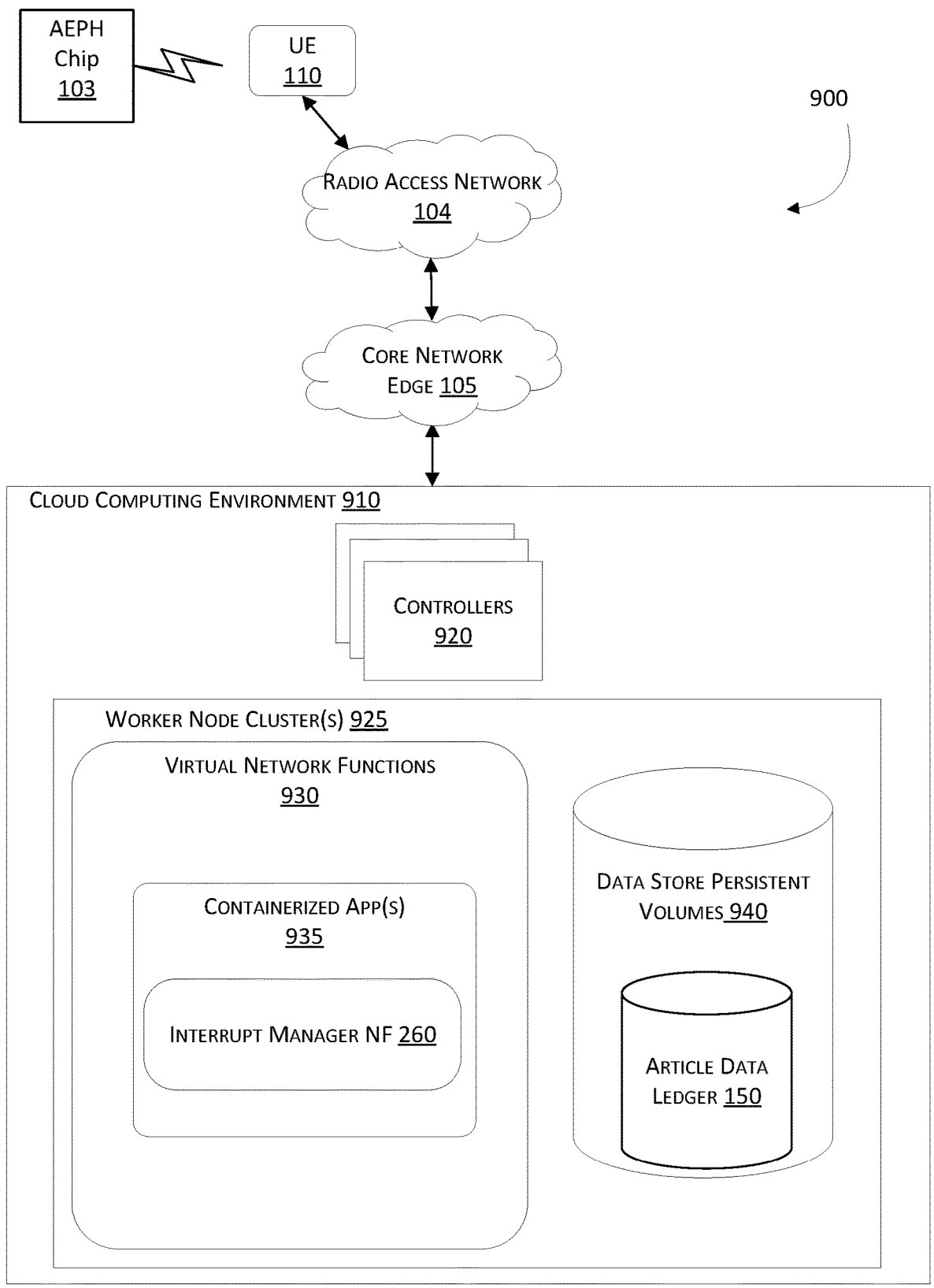
FIG. 9 is an example cloud computing platform, in accordance with some embodiments described herein.

Referring to FIG. 9, a diagram is depicted general at 900 of an exemplary cloud computing environment 910 for implementing one or more aspects of a user equipment network radio link state management service as implemented by the systems and methods described herein. Cloud computing environment 910 is but one example of a suitable cloud-computing environment and is not intended to suggest any limitation as to the scope of use or functionality of the embodiments presented herein. Neither should cloud-computing environment 910 be interpreted as having any dependency or requirement relating to any one or combination of components illustrated. In some embodiments, the cloud-computing environment 910 is executed within operator core network 106, the core network edge 105, or otherwise coupled to the core network edge 105 or operator core network 106.

Cloud computing environment 910 includes one or more controllers 920 comprising one or more processors and memory. The controllers 920 may comprise servers of a data center. In some embodiments, the controllers 920 are programmed to execute code to implement at least one or more aspects of the interrupt manager network function(s) 260. For example, in one embodiment the interrupt manager network function(s) 260 are virtual network functions (VNFs) 930 running on a worker node cluster 925 established by the controllers 920. The cluster of worker nodes 925 may include one or more orchestrated Kubernetes (K8s) pods that realize one or more containerized applications 935 for the interrupt manager NF(s) 260. In other embodiments, another orchestration system may be used to realize the interrupt manager NF(s) 260. For example the worker nodes 925 may use lightweight Kubernetes (K3s) pods, Docker Swarm instances, and/or other orchestration tools. In some embodiments, the UE 110 may be coupled to the controllers 920 of the cloud-computing environment 910 by access network 104. In some embodiments, article data ledger 150 may be implemented at least in part as one or more data store persistent volumes 940 in the cloud-computing environment 910.

In various alternative embodiments, system and/or device elements, method steps, or example implementations described throughout this disclosure (such as the UE, access network, core network edge, operator core network, interrupt manager network function(s), article data ledger, and/or any of the sub-parts thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Verilog or Very High Speed Integrated Circuit (VHSIC) Hardware Description Language (VHDL).

As used herein, the terms "function", "unit", "server", "node" and "module" are used to describe computer processing components and/or one or more computer executable services being executed on one or more computer processing components. In the context of this disclosure, such terms used in this manner would be understood by one skilled in the art to refer to specific network elements and not used as nonce word or intended to invoke 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for user equipment network radio link state management, the system comprising:
one or more processors; and
one or more computer-readable media storing computer-usable instructions that, when executed by the one or more processors, cause the one or more processors to:
communicate between a first user equipment (UE) and a radio access network of a telecommunications network through a UE radio link, the UE radio link comprising one or more data channels;
determine when an ambient electromagnetic power harvesting (AEPH) chip communication event is pending;
suspend a UE connection state of at least one data channel of the one or more data channels of the UE radio link in response to the determining when the AEPH chip communication event is pending;
perform the AEPH chip communication event; and
release suspension of the UE connection state of the at least one data channel of the one or more data channels of the UE radio link;
wherein the AEPH chip communication event includes:
transmission of an interrogation signal to an AEPH chip; and
reception of a response signal from the AEPH chip.

2. The system of claim 1, the one or more processors further to:
perform the AEPH chip communication event during a network interrupt duration, wherein the UE connection state remains suspended for the network interrupt duration; and
release suspension of the UE connection state after an expiration of the network interrupt duration.

3. The system of claim 2, wherein the expiration of the network interrupt duration is based on one or both of a time duration or an event.

4. The system of claim 1, wherein one or both of the interrogation signal or the interrogation signal comprise a frequency used by at least one of the one or more data channels.

5. The system of claim 1, wherein the AEPH chip communication event includes communicating with an AEPH chip using at least one frequency used by at least one of the one or more data channels.

6. The system of claim 1, wherein the AEPH chip communication event comprises communicating with an Radio Frequency Identification (RFID) chip.

7. The system of claim 1, further comprising:
a radio module circuit that includes at least a radio frequency (RF) transmit (TX) path and an RF receive path, wherein the one or more processors further to:
control the radio module circuit to communicate with the radio access network using uplink (UL) radio frequency (RF) signals and downlink (DL) RF signals; and
control the radio module circuit to perform the AEPH chip communication event to transmit one or more interrogation signals to an AEPH chip and receive one or more response signals from the AEPH chip.

8. The system of claim 1, the one or more processors further to suspend the UE connection state of the at least one data channel by communicating a network interrupt request to a network function of an operator core network of the telecommunications network.

9. The system of claim 1, the one or more processors further to:
determine when the AEPH chip communication event is pending based on data from a trustlet executing in a trusted execution environment of the first UE.

10. The system of claim 1, the one or more processors further to:
communicate between the first UE and the radio access network using a second UE radio link in response to suspending the UE connection state of at least one data channel.

11. A system for user equipment network radio link state management, the system comprising:
one or more processors; and
one or more computer-readable media storing computer-usable instructions that, when executed by the one or more processors, cause the one or more processors to:
communicate between a first user equipment (UE) and a radio access network of a telecommunications network through a UE radio link, the UE radio link comprising one or more data channels;
determine when an ambient electromagnetic power harvesting (AEPH) chip communication event is pending;
suspend a UE connection state of at least one data channel of the one or more data channels of the UE radio link in response to the determining when the AEPH chip communication event is pending;
perform the AEPH chip communication event;
release suspension of the UE connection state of the at least one data channel of the one or more data channels of the UE radio link; and
query a ledger using the at least one data channel after release of suspension of the UE connection state, in response to information received by the first UE from the AEPH chip communication event.

12. The system of claim 11, the one or more processors further to:
perform the AEPH chip communication event during a network interrupt duration, wherein the UE connection state remains suspended for the network interrupt duration; and
release suspension of the UE connection state after an expiration of the network interrupt duration.

13. The system of claim 11, wherein the AEPH chip communication event includes communicating with an AEPH chip using at least one frequency used by at least one of the one or more data channels.

14. The system of claim 11, the one or more processors further to suspend the UE connection state of the at least one data channel by communicating a network interrupt request to a network function of an operator core network of the telecommunications network.

15. The system of claim 11, the one or more processors further to:
communicate between the first UE and the radio access network using a second UE radio link in response to suspending the UE connection state of at least one data channel.

16. A method for user equipment network radio link state management, the method comprising:
communicating between a first user equipment (UE) and a radio access network of a telecommunications network through a UE radio link, the UE radio link comprising one or more data channels;
determining when an ambient electromagnetic power harvesting (AEPH) chip communication event is pending;
suspending a UE connection state of at least one data channel of the one or more data channels of the UE radio link in response to the determining that the AEPH chip communication event is pending;
performing the AEPH chip communication event;
releasing suspension of the UE connection state of the at least one data channel of the one or more data channels of the UE radio link; and
querying a ledger using the at least one data channel after releasing suspension of the UE connection state, in response to information received by the first UE from the AEPH chip communication event.

17. The method of claim 16, further comprising:
performing the AEPH chip communication event during a network interrupt duration, wherein the UE connection state remains suspended for the network interrupt duration; and
releasing suspension of the UE connection state after an expiration of the network interrupt duration.

18. The method of claim 16, further comprising:
controlling a radio module circuit to communicate with the radio access network using uplink (UL) radio frequency (RF) signals and downlink (DL) RF signals; and
controlling the radio module circuit to perform the AEPH chip communication event to transmit one or more interrogation signal to an AEPH chip and receive one or more response signals from the AEPH chip.

19. The method of claim 16, further comprising sending a network interrupt request to a network function of an operator core network of the telecommunications network.

20. The method of claim 16, further comprising:
suspending the UE connection state of the at least one data channel by sending a radio link suspend message to a radio resource control protocol stack layer, and
releasing suspension of the UE connection state of the at least one data channel by sending a radio link suspension release message to the radio resource control protocol stack layer.

* * * * *